United States Patent [19]
Rangarajan

[11] Patent Number: 5,822,454
[45] Date of Patent: Oct. 13, 1998

[54] SYSTEM AND METHOD FOR AUTOMATIC PAGE REGISTRATION AND AUTOMATIC ZONE DETECTION DURING FORMS PROCESSING

[75] Inventor: Vijayakumar Rangarajan, San Jose, Calif.

[73] Assignee: Rebus Technology, Inc., Sunnyvale, Calif.

[21] Appl. No.: 419,135

[22] Filed: Apr. 10, 1995

[51] Int. Cl.[6] ........................................ G06K 9/34
[52] U.S. Cl. .................... 382/180; 382/176; 382/289; 395/761
[58] Field of Search ..................... 382/180, 173, 382/174, 176, 240, 224, 197, 206, 306, 305, 289; 358/453, 462; 395/761, 770

[56] References Cited

U.S. PATENT DOCUMENTS

| | | | |
|---|---|---|---|
| 3,636,513 | 1/1972 | Tisdale ..................................... | 382/224 |
| 5,140,650 | 8/1992 | Casey et al. ............................. | 382/283 |
| 5,185,813 | 2/1993 | Tsujimoto ................................ | 382/240 |
| 5,416,849 | 5/1995 | Huang ...................................... | 382/173 |
| 5,465,304 | 11/1995 | Cullen et al. ............................ | 382/176 |
| 5,513,304 | 4/1996 | Spitz et al. .............................. | 395/144 |

FOREIGN PATENT DOCUMENTS

| | | | |
|---|---|---|---|
| 0 654 746 A3 | 5/1995 | European Pat. Off. ........ | G06F 17/60 |
| WO 95/34046 | 12/1995 | WIPO .............................. | G06K 9/20 |

OTHER PUBLICATIONS

Fujihara et al., "Qualitative/Fuzzy Approach to Document Recognition" Proc. of the Eighth Conf. on AI for Applications, pp. 254–260, Mar. 1992.

Casey, R.G. and Ferguson, D.R., "Intelligent Forms Processing", IBM Systems Journal, vol. 29, pp. 435–450, No. 3, 1990, Armonk, N.Y.

Dengel, A., Luhn, A. and Ueberreiter, B., "Model Based Segmentation and Hypothesis Generation for the Recognition of Printed Documents", SPEI, vol. 860, Real Time Image Processing: Concepts and Technologies, pp. 89–94, 1987.

Higashino, J., Fujisawa, H., Nakano, Y., and Eijiri, M., "A Knowledge–Based Segmentation Method for Document Understanding", 8th International Conference on Pattern Recognition, pp. 745–748, Oct. 27, 1986.

Heck, M., 'Optical Character Recognition Software: The Recognition Factor,' Inforworld, Mar. 6, 1995, 64–81, vol. 17, Issue 10.

Primary Examiner—Leo Boudreau
Assistant Examiner—Bhavesh Mehta
Attorney, Agent, or Firm—Fenwick & West LLP

[57] ABSTRACT

A system and method automatically detects user defined zones in a document image of a form, compensating for skew and displacement of the image with respect to a original image of form. The system provides a mechanism to input an image for a form document, such as a scanner. The system processes the image to reduce its resolution and to remove significant skew. The image is presented to the user to define the zones. These zones are areas from which the user desires to extract meaningful data through optical character recognition, such as names, dates, addresses, and items on a invoice form. The system further processes the image to remove horizontal and vertical lines, and to create a number of blocks, representing either text or image data. The lines are removed and the blocks formed by runlength smoothing with various parameters. The blocks form clusters of connected pixels. The blocks are labeled such that any set of connected blocks share a unique identification value. Additional data is collected on the commonly labeled blocks to select those blocks useful to definition of a template. The template is a collection of vectors between the centroids of each of the selected blocks. A second document image for processing is obtained, and similarly processed to minimize, deskew, and identify blocks and vectors therein. The vectors in the second document image are compared with vectors in an user selected template to determine the location of user defined zones in the second document image.

21 Claims, 33 Drawing Sheets

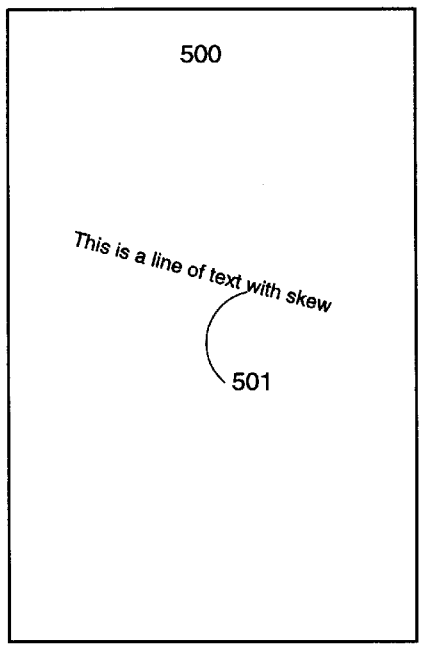
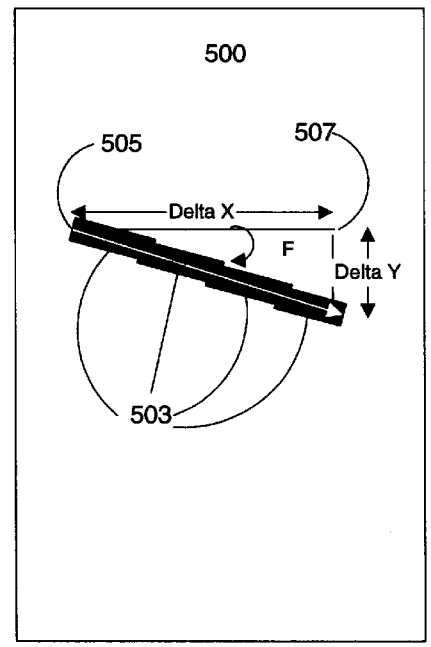
FIGURE 5a
FIGURE 5b

SYSTEM AND METHOD FOR AUTOMATIC PAGE REGISTRATION AND AUTOMATIC ZONE DETECTION DURING FORMS PROCESSING

BACKGROUND

1. Field of Invention

This invention relates to the field of forms processing with optical scanners and optical character recognition, and more particularly, to systems and methods that automatically detect and compensate for page skew and translation.

2. Background of Invention

Optical character recognition ("OCR") is widely used to extract text from printed or handwritten documents and forms. Typically, a document is scanned on an optical scanner to produce bit mapped image data. An OCR software application processes the image data and extracts therefrom all of the text. A user then often reviews the resulting text file and either further processes it with other software to obtain only desired information or stores it in a useful form, such as in a word processing, database, spreadsheet, accounting system, or the like.

In forms processing, it is desirable to extract from a text based preprinted form only that text data that has been added to the form by a user. For example, on an invoice with existing text data such as a company's name, address, and descriptions of various text blocks such as "Customer Name," "Customer Address", "Item," "Quantity," and the like, it is desirable to extract only the information entered for such blocks, but not the descriptive text. This allows for more efficient processing of the text data, without the need to post-process all of the text to extract the useful information.

Previous systems for forms processing have used templates with user defined zones located in the template to identify locations on an input document image where the desired text is likely to be found. In these systems, the user defined zones in the template are located with respect to the identified boundaries of the image, that is, the top, bottom and sides of the image as defined in the bit map.

The problem with these conventional systems is that when a subsequent document is processed with the template, the user defined zones do not accurately register, or locate, on the image produced from the document. This occurs because when the document is scanned, the document may be rotated with respect to the scanner's bed, either because of misfeeding by a document feeder, or improper placement by a user. Additionally, the document may be displaced from the sides of the scanner's bed. In either case, the resulting bit mapped image will vary, possibly considerably, from the bit mapped image of the original template, and the user defined zones, will not map onto the correct portions of the image. As a result, the system will not be able to capture the correct text in each of the user defined zones.

Accordingly, it is desirable to provide a system and method that can correctly identify user defined zones from a template on an input image even in the presence of large amounts of skew or displacement.

SUMMARY OF THE INVENTION

The present invention overcomes the foregoing limitations by a method and system that automatically identifies the user defined zones within a document even in the presence of significant amounts of skew or displacement.

The basic concept underlying the invention is that the relationship between various text or image elements in an image without skew will remain the same, irrespective of the skew, position displacement, page-image resolution, or page size at a given brightness and contrast setting. Specifically, the relative distances between these text and/or image areas do not change by any of the parameters as mentioned above. Accordingly, the relationships between different text and image areas on a given page are captured and used for page registration and user defined zone detection. The relationship between different text and image areas are captured by using dynamic data networks.

A dynamic data network is a network of links or vectors that are connected to certain qualified system blocks present within an image. Dynamic data networks are unique to each image at a particular brightness and contrast setting. A template including a dynamic data network is formed by processing an input image, preferably from a form, that will be used to process subsequently input documents. When these documents are later input, a dynamic data network is produced for each input image, and compared with the dynamic data network of a selected template. Where there is a match, the system can then accurately locate the user defined zones on the image, and thereby use an optical character recognition facility to extract the text or any user defined information from the image at those locations.

A template is formed by a number of processing operations. Preferably, the input image is subsampled to about 50 dpi. Skew is detected and the image is rotated to remove the skew. A data preparation stage removes horizontal and vertical lines, and then smoothes the remaining image data, which should be mainly text data and picture type data, into blocks of connected pixels. These blocks are then labeled, provided with an identification number, and classified into text, image, or dual blocks.

The classified blocks are further filtered for size and shape to provide a number of system blocks suitable for use in a dynamic data network. Certain ones of the system blocks are selected, according to location and size in the image, and from these, a dynamic data network is created. The dynamic data network defines the relationship between the system blocks in a resolution, size, skew, and displacement invariant manner. Since the system blocks do not change much at a given brightness and contrast setting, the vectors that define the dynamic data networks are less susceptible to variations in skew, displacement, and the like.

BRIEF DESCRIPTION OF THE DRAWINGS

FIGS. 5a and 5b are illustrations of the skew detection process for detecting skew in an input image.

FIG. 14 is an illustration of a deskewed bitonal image subsampled at 50 dpi.

FIG. 17 is an illustration of the image of FIG. 14 without horizontal lines.

FIG. 18 is an illustration of the image of FIG. 17 normalized and rotated.

FIG. 21 is an illustration of a deskewed rotated image without horizontal or vertical lines, from the combination of the image of FIGS. 18 and 20.

FIG. 22 is an illustration of the correctly rotated image of FIG. 21 following denormalization.

FIGS. 28a–h are illustrations a dynamic data network in various stages of construction.

DETAILED DESCRIPTION OF THE INVENTION

System Architecture

Figure 1:
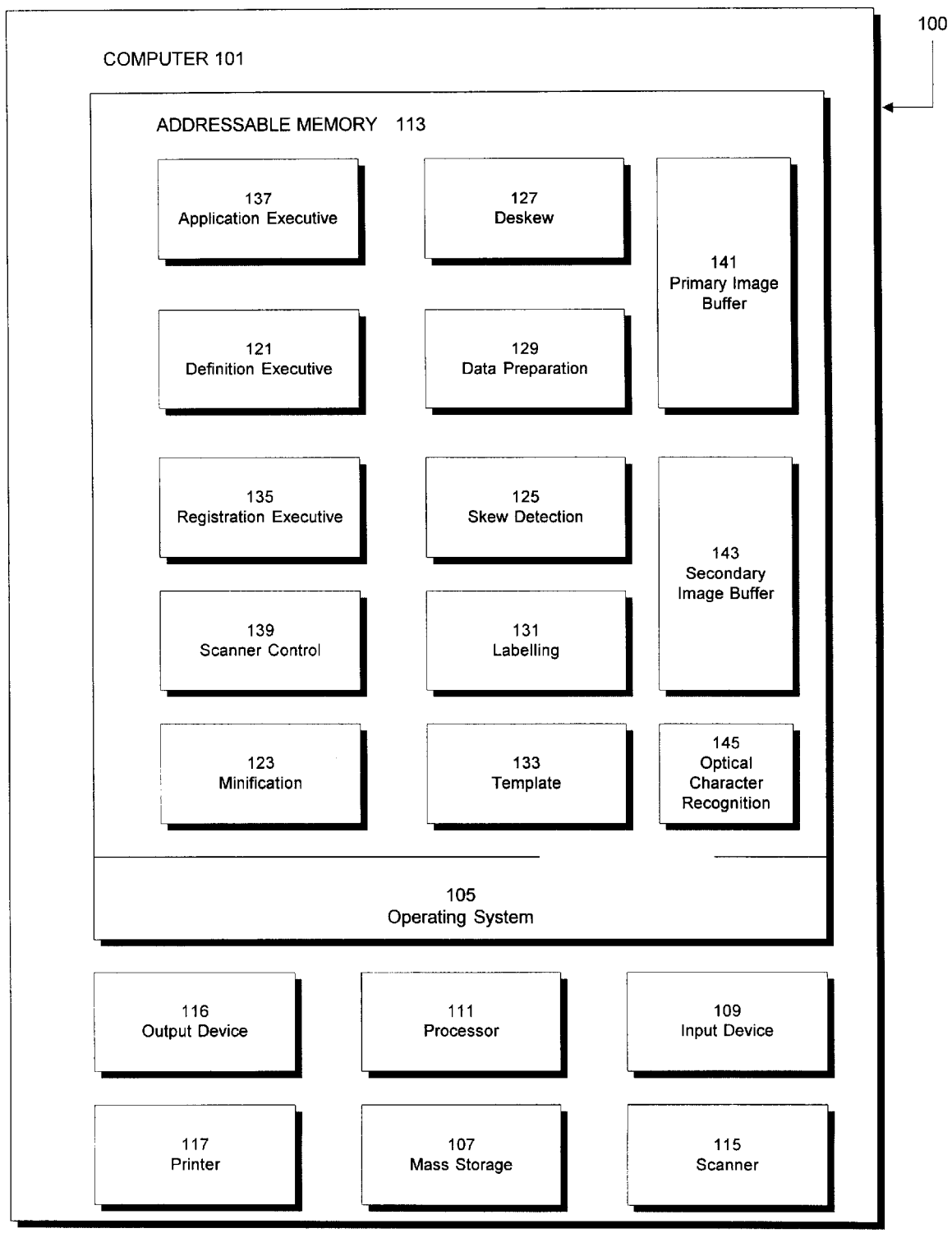
FIG. 1 is a block diagram of a system for automatically registering and detecting user defined zones in input documents using templates.

Referring now to FIG. 1, there is shown a system for using the improved automatic page registration system of the present invention. The system 100 includes a computer 101 having a secondary storage 107 for long terms storage of scanned documents and page registration templates, an input device 109 and an output device 116 for receiving and outputting commands and data into the system 100, and an addressable memory 113 for storing the various code modules for execution by a processor 111. The system 100 includes a scanner 115 that is capable of scanning input documents, and producing either grayscale, black and white, or color bit map files for the input documents. The scanner 115 preferably has at least 50 dpi resolution. The system 100 includes a printer 117 for printing documents, including scanned documents, or other documents resident in the system 100.

The addressable memory 113 includes a number of code modules that together comprise an executable application that manages the automatic page registration method of the present invention. More particularly, the addressable memory 113 includes an application executive 137, a scanner control module 139, a definition executive 121, a registration executive 135, a minification module 123, a skew detection module 125, a deskewing module 127, a data preparation module 129, a labeling module 131, and a template module 133, and an optical character recognition module 145. The operation of these various modules will be described below, following a description of the processes that support automatic page registration. The addressable memory 113 further includes a primary image buffer 141 and secondary image buffer 143, which are used to store an image in various states of transformation by the modules.

The application executive 137 provides overall control of the system 100, including the remaining modules. The application executive 137 provides a user interface for communication with the user, for receiving user commands and data. Through a suitable user interface, the application executive 137 allows the user to input documents into the system 100 with the scanner 115, or other source, to create templates for processing the documents with definition executive 121, and to process further input documents with defined templates with the registration executive 135.

System Operation

I. Overall Process Flow

The system 100 provides an improved method for automatically registering an input document to eliminate skew and translation, and thereby provides for the more accurate extraction of data from the document using optical character recognition. The method includes two basic processes: creating a template for a given type of document or form, and applying the template to an input document to identify and extract data from the form.

Figure 2:
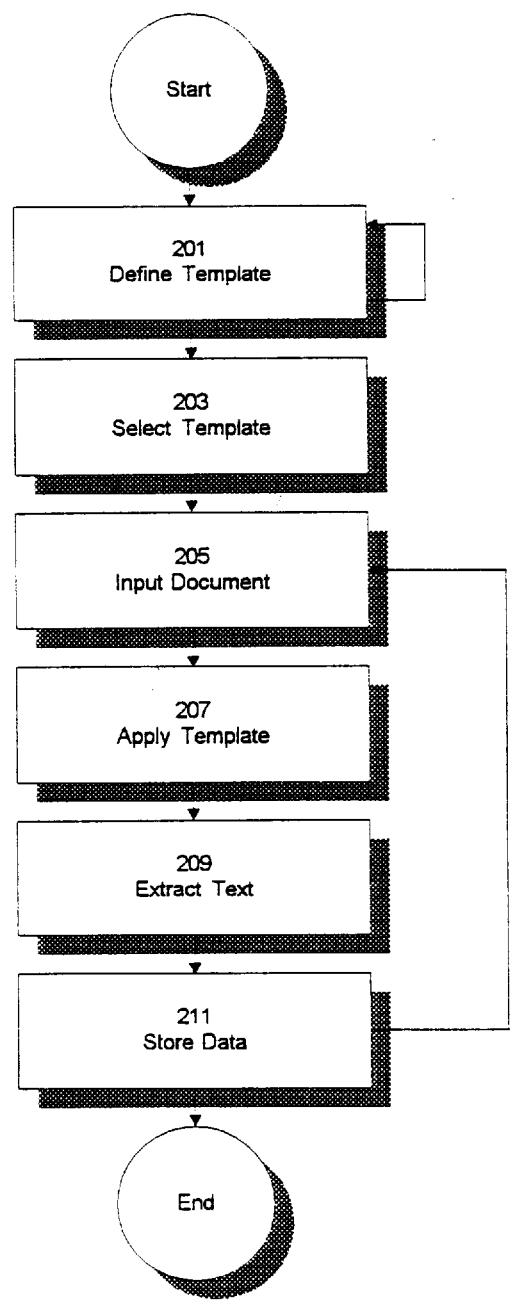
FIG. 2 is a flowgraph of the overall method of template definition and page registration.

Referring now to FIG. 2, there is shown a flowgraph of the overall method of the present invention. The user, in conjunction with the system 100, defines 201 a template for a given form. Each template describes the internal structure of a form by specifying a number of user defined zones that contain text data to be extracted, and a number of blocks identified by the system. The template is defined by the relationship among the system defined blocks. The user can create any number of templates, each corresponding to a particular form. For example, the user may define different templates for processing invoices, purchases orders, business response cards, survey forms, questionnaires, facsimiles, business cards, and the like. These are but a few of the many different possible forms for which templates can be created. Accordingly, a form is understood here to mean any type of document for which multiple instances containing different data are produced and used. The creation and definition of the templates is managed by the definition executive 121.

The user then selects 203 a particular template from among a set of defined templates. For example, if the user is processing a stack of invoices, the user would select an appropriate invoice template for such documents.

The user proceeds to input 205 in the documents into the system 100. This is preferably done with the scanner 115 and scanner control module 139. Alternatively, the user may input 205 the documents from other sources, including direct facsimile reception. Any source of input documents can be used that produces for each document a bit mapped image file. Alternatively, vector based files may be used if suitably converted to bit mapped images.

As each document is input 205, the selected template is applied 207 to the image of the document. The template identifies on the document the user defined blocks containing the text data that the user desires to extract. This identification is performed automatically, and identifies the user defined blocks even in the presence of skew or displacement in the image with respect to the original form that defined the template. Thus, even if the input document is misfed into the scanner 115, for example, and the resulting image is skewed, the system 100 is still capable of identifying the user defined zones. In addition, there is no need to place on the form additional registration marks conventionally employed to locate and orient documents during scanning. The application of the template to an image is performed by the registration executive 135.

Once the user defined zones are identified, the system 100 applies the optical character recognition module 145 in a conventional manner to extract 209 the text data from the identified user defined zones. This data is stored 211 for subsequent retrieval and processing. The user may continue to input 205 additional documents, or may terminate processing.

II. Template Definition

Figure 3:
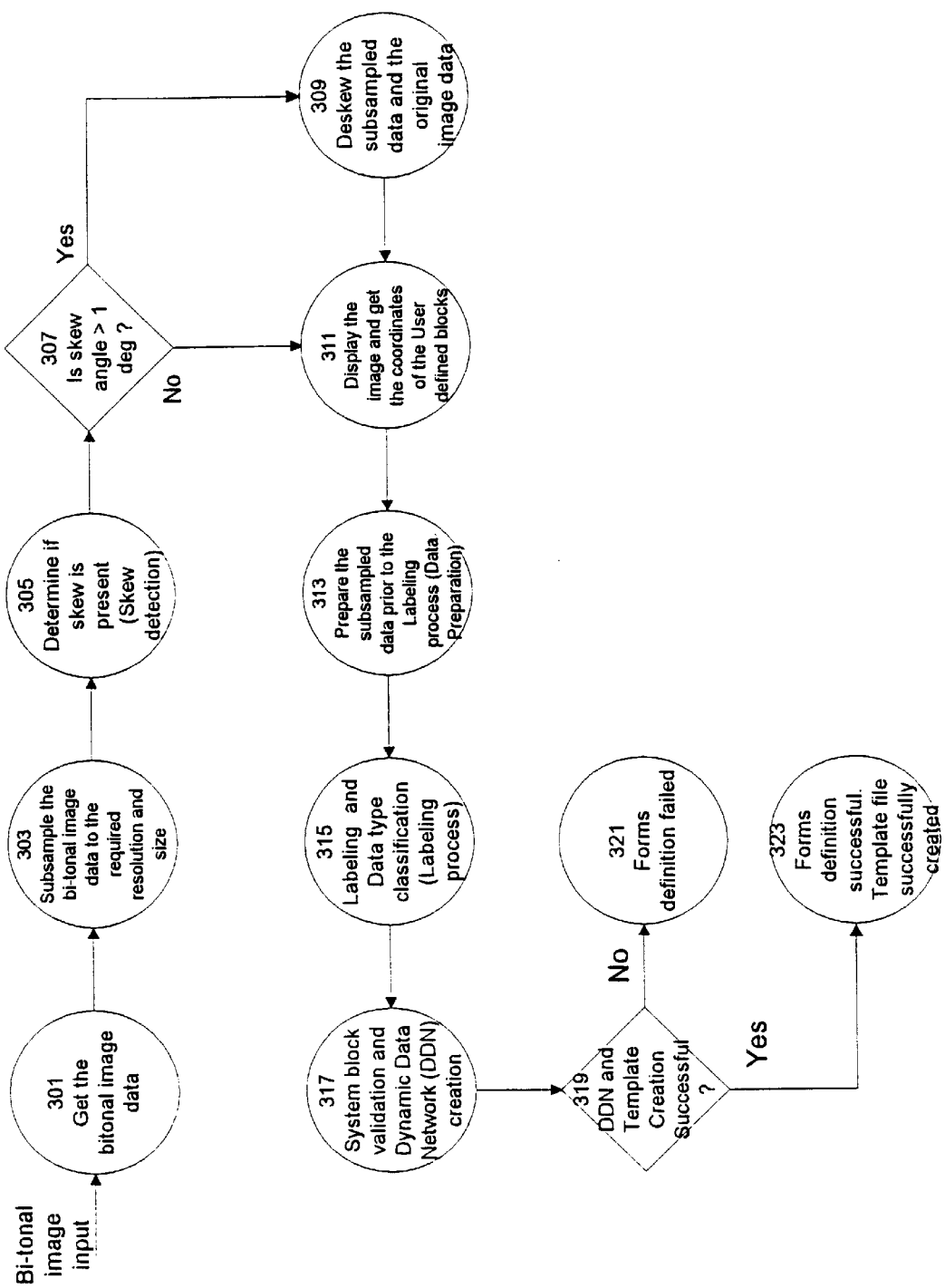
FIG. 3 is a flowgraph of the process of a defining a template.
Figure 4:
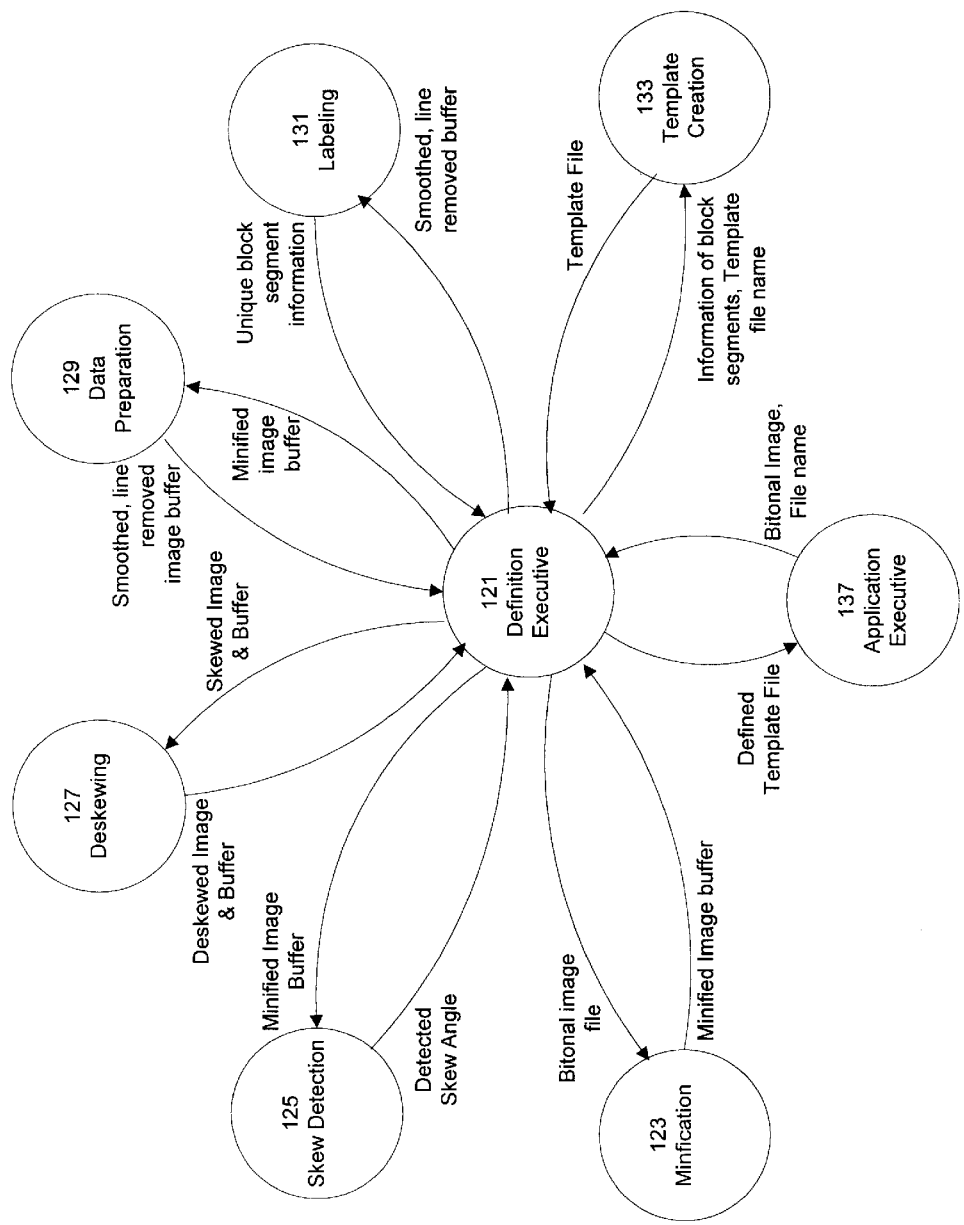
FIG. 4 is a dataflow diagram of the definition executive with respect to various modules used to create a template definition.

Referring now to FIG. 3, there is shown a flowgraph of the process 201 of defining a template, and referring to FIG. 4, there is shown a dataflow diagram of the definition executive 121 in cooperation with other modules during definition of a template. The definition executive 121 manages the operation of the modules 123–133, invoking each module as required, passing in the necessary inputs to the module, and receiving the outputs therefrom to create the template. FIGS. 14 through 28 are illustrations of a given input document through the various stages of template definition.

A. Image Generation

Template definition begins by inputting 301 a form into the system 100 which is an exemplar of a type of document from which the user desires to capture selected data in specific areas or zones on the form. For example, the user may desire to create a template of an invoice, and capture by optical character recognition text data in specific areas, such as the customer name, address, the invoice number, the product description, quantity, and price, and the total amount.

To input 301 the form the user preferably uses the scanner 115 in conjunction with the scanner control module 139. The scanner control module 139 controls the operation of the scanner 115, for example, to set brightness, contrast, resolution, and the like. The scanner 115 outputs an image file which may be a grayscale, bitonal, or color bit map. Where the scanner 115 outputs grayscale or color images, the scanner control module 139 preferably performs thresholding to produce a bitonal image for use in the system. Any standard thresholding technique can be used to obtain bitonal image. Essentially, any given grayscale or color image (4, 8 or 24 bits per pixel) is converted to 1-bit-per-pixel by determining if a given grayscale or color pixel exceeds predetermined threshold value x, where x is typically set at $2^{depth/2}$, where "depth" is the number of bits per pixel in the image. If so, the pixel value is assigned a 1, and if not, then the pixel is assigned a 0. A pixel value of 1 may mean the pixel is set or vice versa, as desired for implementation. Additionally, image files from any other sources may be input into the system 100, and processed according to the present invention. Such sources include facsimile images, graphic images produced from graphic application, or even images captured from scanned photographs, or video, or the like.

B. Image Minification

The definition executive 121 receives the bitonal image file from the scanner control module 139 via the application executive 137, or form any other source. The definition executive 121 passes the bitonal image file to the minification module 123. The minification module 123 minimizes 303, or subsamples the input bitonal image, reducing the resolution of the image from its original resolution to a lower resolution more suitable to forms processing and template definition. Conventional scanners, such as scanner 115 produce a high resolution image (at least 600 dpi) which is useful to produce highly accurate optical character recognition. However, this level of resolution is unnecessary to create and define templates for forms processing, and further, imposes extra demands on memory and storage requirements, and significantly impacts performance. The minification module 123 thus detects the original source resolution and computes a scale or subsampling factor for the image.

In the preferred embodiment, the input image scaled to approximately 50 dpi from the source resolution, and an appropriate scale factor is computed for this result. For example, if an image that has an original resolution of 200 dpi, the scale factor is 4, and the resulting subsampled image will be 25% of the size of the original image. Where the source resolution is not a multiple of 50 dpi, a scale factor is chosen to result in a resolution closest to 50 dpi, and preferably an image size equal to or less than 64 kb. The limitation on image size is useful to improve overall performance, and to avoid limitations induced by the existing x86 architecture and supporting development tools. The preferred embodiment of the minification module 123 uses a decimation technique where a proportionate number of pixels are dropped off from the original image during the subsampling process. For example, if the bitonal image is at 300 dpi, for every bit selected, the next 6 bits are ignored. The minification module 123 outputs the subsampled image in the image buffer 141. The image buffer 141 is used throughout processing to maintain one current state of the processed input image.

C. Skew Detection

Once the image file is minimized 303, the definition executive 121 activates the skew detection module 125 to identify 305 the presence and degree of skew in an input image. The skew detection module 125 accesses the image buffer 141 to obtain the subsampled image output by the minification module 123. In the preferred embodiment, the skew detection module 125 is capable of detecting skew between −60° and +60°, where 0° represents a perfect horizontal and vertical alignment of the input document on the scanner 115.

FIGS. 5a and 5b are a graphical illustration of the skew detection analysis. A scanned image 500 will include a line of text 501 that presents some degree of skew. The line of text 501 is smoothed, resulting in a number of text blocks 503, each containing a continuous series of pixels. Also present in the image may be image blocks (not shown) which contain non-text derived data, such as lines, shading, and the like. Connected blocks 503 are identified. An imaginary line 505 between the left edge and the right edge of a connected set of blocks 503 is computed, and a skew angle F is determined between this line and a horizontal line 507 extending from the left edge of the blocks 503. This process is repeated for each connected set of blocks in an image 500, and a skew angle F is associated with each such set of connected blocks 503. Where a majority of the individual skew angles F are substantially the same, within a specified range of tolerance, then all of the individual skew angles F are averaged to produce a skew angle for the image 500, along with an orientation (clock/counterclockwise).

Figure 6:
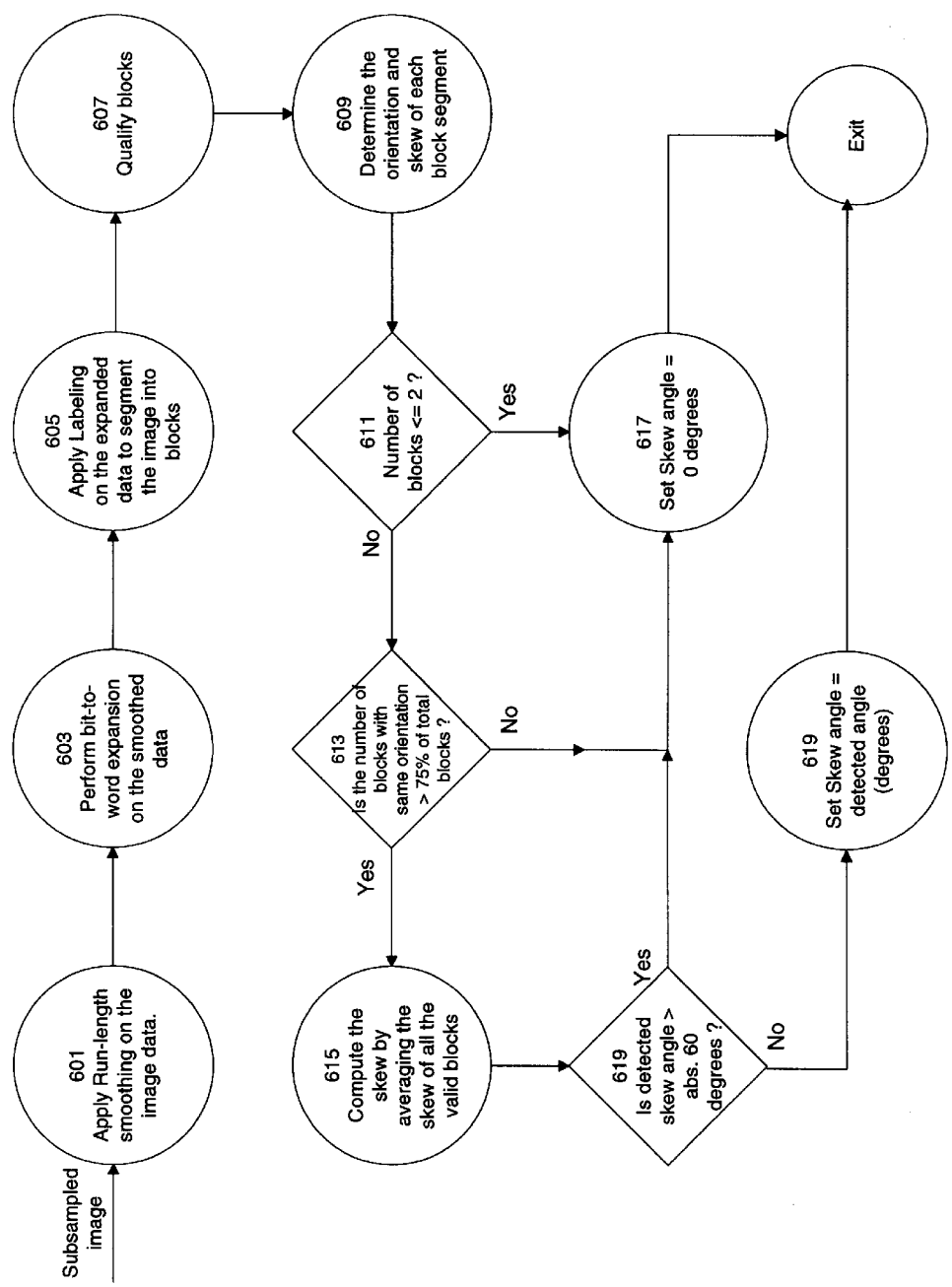
FIG. 6 is a flowgraph of the process for skew detection.
Figure 8:
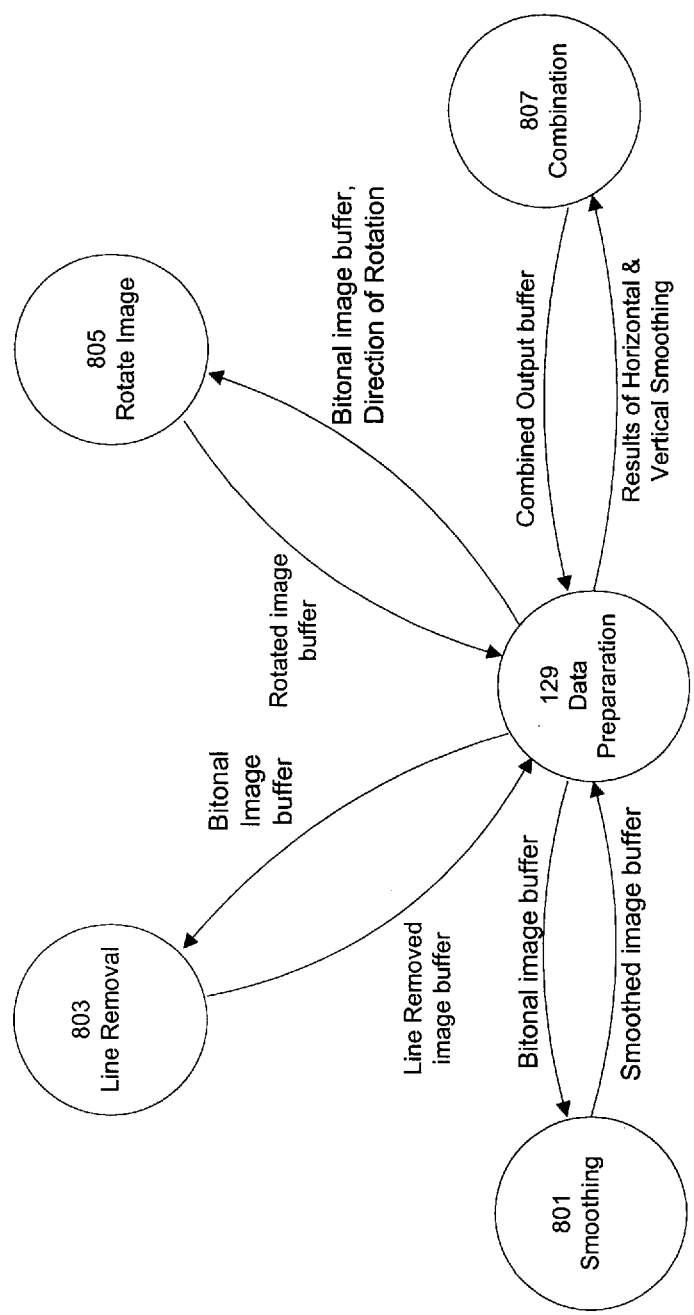
FIG. 8 is a data flow diagram of the data preparation module in conjunction with various modules for preparing an input image.

Referring to FIG. 6, there is shown a flowgraph of the preferred method of skew detection by the skew detection module 125. The skew detection module 125 performs 601 runlength smoothing on the subsampled pixel data in the image buffer 141 to produce the smoothed blocks. This is done by calling a smoothing module 801 (FIG. 8). The smoothing module 801 applies a general runlength smoothing operation on unset (white) pixels in the input image using an input runlength parameter, converting the unset pixels to set (black) pixels. In the preferred embodiment, the smoothing at this point is performed with runlength value of 5, which is based on the preferred resolution of the image (50 dpi), and typical font sizes in text documents. Where other resolutions are used in the system, a different runlength parameter is specified. The smoothed image is maintained in the primary image buffer 141.

The skew detection module 125 then expands 603 each bit, representing each pixel in the image, to a word (2 bytes). Expanding each bit to a 16 bit representation allows for storage of additional information about each pixel, such as a unique identification value, and information associating the pixel with other pixels, and thereby identifying the individual blocks. If additional bit width is needed for block identification numbers or other information, expanding to additional bytes may be used. Each word is later used by the labeling module 131 to store the block identification values. For example, after the smoothing operation, if the pixel includes a portion such as 1111111110000000, where '1' represents the presence of data (black pixel) and '0' represents no presence of data (white pixel), then after expansion, each bit is stored as a 2 byte word: 0000000000000001, 0000000000000001, 0000000000000001, 0000000000000001, 0000000000000001, 0000000000000001, 0000000000000001, . . . and 0000000000000000, 0000000000000000, 0000000000000000, and so on.

The skew detection module 125 then calls 605 the labeling module 131 to segment the pixels in the image into blocks. The operation of the labeling module 131 is further described below. The labeling module 131 identifies each of the blocks from the pixel data, and further identifies each set of connected blocks, that is, blocks that are connected by black (set) pixels. Each set of connected block(s) is labeled with a unique identification number, such that all connected blocks have the same identification number.

Not all of the blocks in the image are useful to determining the overall skew of the image. Particularly, blocks that either too small or too large with respect to the overall image size tend not to contribute significantly to the actual overall skew. Small blocks provide very little skew information, and big blocks give too large skew values. Accordingly, the skew detection module 125 filters 607 out blocks that are outside of predetermined ranges for height and width, prior to determining their skew angles. In the preferred embodiment, the skew detection module 125 filters out blocks with a height greater than 99 pixels and a width greater than 149 pixels, or blocks with a height less than 6 pixels and a width less than 25 pixels. Again, the filter parameters are based on the resolution of the subsampled image, and would be adapted according to other resolutions. From the remaining blocks, the average height and average width is determined, and only blocks with dimensions exceeding these values are further processed. The blocks that are not filtered out are valid blocks.

The skew detection module 125 then determines 609 from the remaining blocks the skew angle F and direction of skew for each set of connected blocks, as described above. The imaginary line is preferably computed from center (in the y-axis) of the left edge of the block to the center of the right edge.

In one preferred embodiment the skew angle is $\operatorname{Tan}^{-1}(\Delta Y/\Delta X)$ where $\Delta X$ is the difference between the x-axis coordinates of the center of the left and right edges of the block, and $\Delta Y$ is the difference between the y-axis coordinates of the edges.

In an alternate embodiment, the imaginary line is taken from the top left to bottom right corners of the block, and thus $\Delta X$ is the difference between the x-axis coordinates of the top left and bottom right corners of the block, and $\Delta Y$ is the difference between the y-axis coordinates of the corners. In this embodiment, the corners are determined as follows. For each pixel column within the block, the bottom of the column is detected as an unset pixel following a series of set pixels. The coordinates of the column bottom are stored. The difference between the bottom of the current pixel column and the bottom of the next pixel column, $\Delta C$, is noted for each pixel column. $\Delta C$ is computed to eliminate the possible skew angle errors that might be introduced by the text ascenders like letters 'h, l, d' and descenders like 'g, p, y'. The average $\Delta C$ value is then taken for the entire block. Pixel columns that have $\Delta C$ values outside of the range of (average $\Delta C$ ±2 pixels) (assuming 50 dpi image) are ignored for determining the ends of the imaginary line which will be used to determine the skew angle. This is the "$\Delta C$ test." The first pixel-column bottom with a $\Delta C$ value that satisfies the $\Delta C$ test while traversing from the top left corner of the block constitutes the beginning of the imaginary line and the last pixel-column bottom satisfying this constraint constitutes the other end of the imaginary line. This process is repeated for each valid block, and orientation (direction of rotation) and skew angle is stored in the expanded word of each pixel.

The skew detection module 125 performs a series of tests to ensure that the image has an amount of direction and skew that is both significant and compensable by the system 100. The skew detection module 125 determines 611 whether the total number of valid blocks is less than or equal to 2. Such a low number of qualified blocks is not predicative of the skew of the whole image. Accordingly, if this is the case, the skew detection module 125 sets 617 the image skew angle F at 0°.

Otherwise, the skew detection module 125 then determines 613 the orientation that is held by the largest number of sets of connected blocks. If this number is a majority, preferably at least 75%, of the total number of sets of connected blocks, then this orientation is taken as the orientation of the entire image. The skew detection module 125 computes the image skew angle F by averaging 615 the individual skew angles F of the valid blocks.

The skew detection module 125 determines 619 whether the image skew angle F is greater than |60°|. If so, then the document may be severely misaligned, and unlikely to be correctly scanned or otherwise captured, and thereby are unlikely to be successfully identified and processed. In this case, the skew detection module 125 sets 617 the image skew angle F to 0°. Otherwise, if the image skew angle F is within the boundary conditions, the skew detection module 125 returns that value. This is shown in FIG. 4 as returning the detected skew angle.

D. Deskewing

Referring again to FIG. 3, with the detected skew angle, the definition executive 121 determines 307 whether or not to deskew the image. In the preferred embodiment, the definition executive 121 does not deskew the image if the image skew angle is equal or less than 1°, as this small amount of skew does not impact registration of the form with respect to a template.

If the image skew angle F exceeds 1°, the definition executive 121 invokes the deskewing module 127, to deskew 309 both the subsampled and the original image back to a true horizontal and vertical orientation. The deskewing module 127 reads both the original image from an image file, and the subsampled image from the image buffer, and rotates them in the direction opposite to their determined skew direction, by their image skew angle F. Rotation is performed using conventional techniques.

Figure 14:
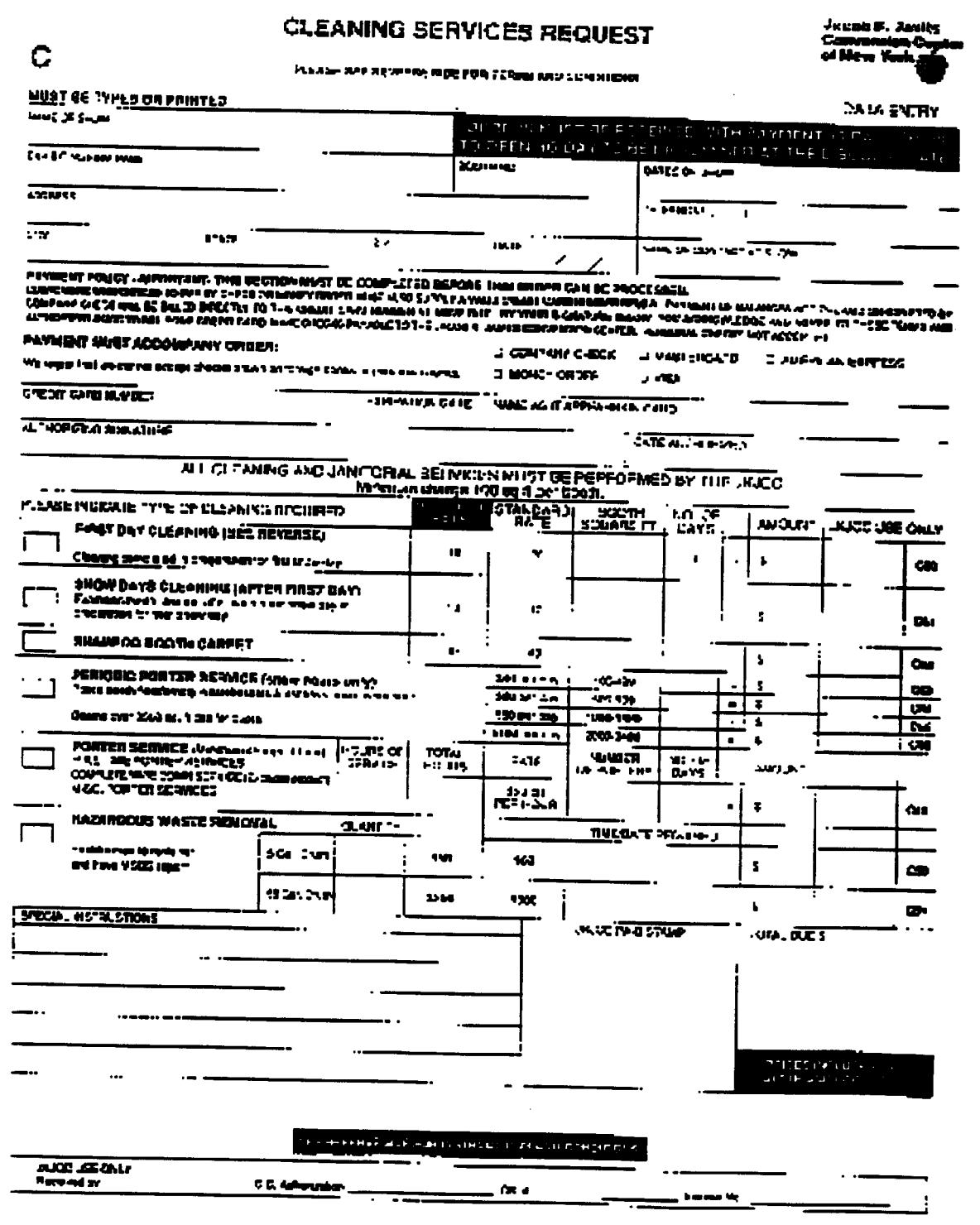

FIG. 14 is an example of an input document that has been scanned into a bitonal image file and subsampled to 50 dpi (printed full page size) and then deskewed.

E. Selection of User Defined Zones

Figure 7A:
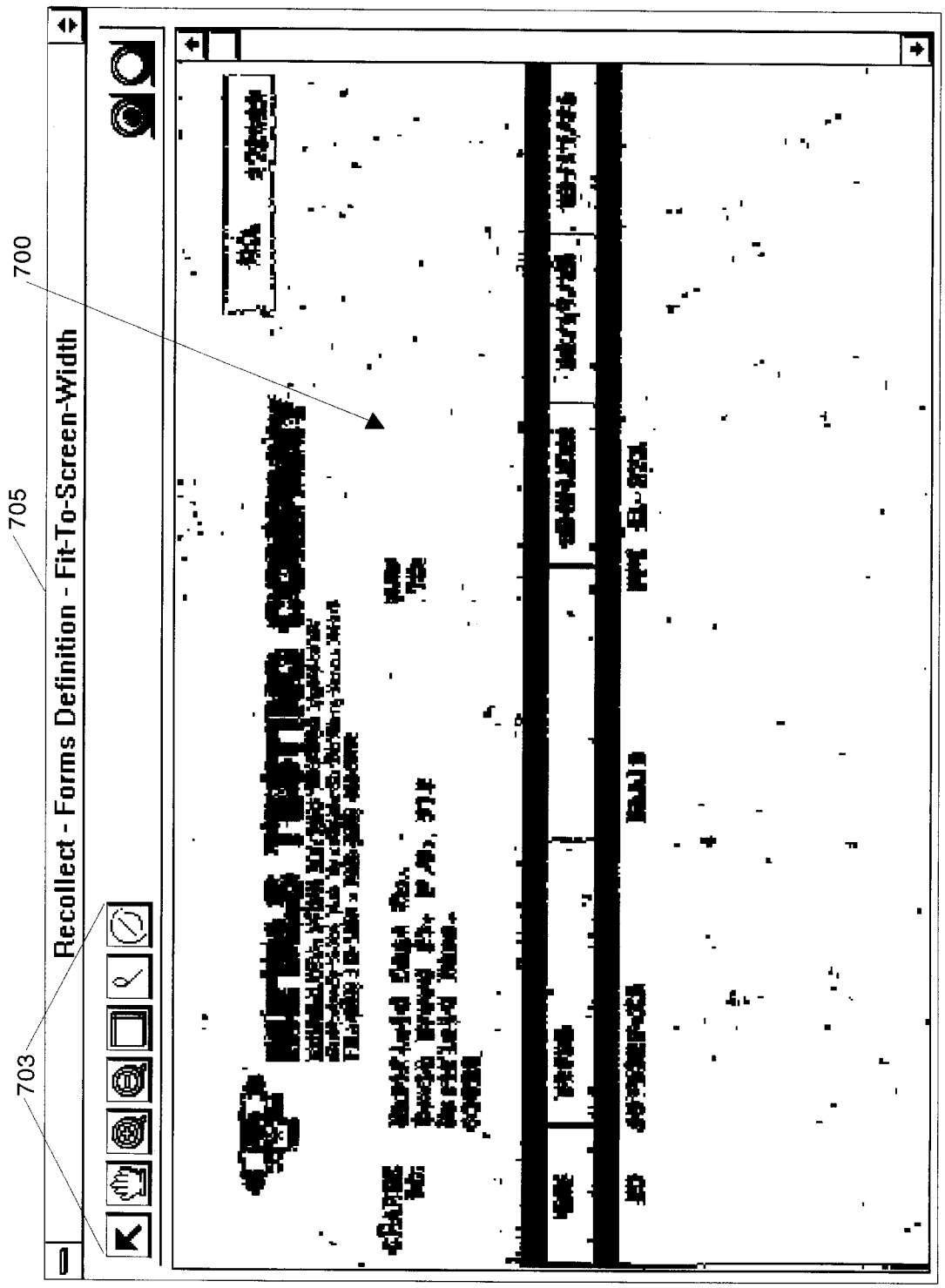
FIGS. 7a and 7b are illustrations of sample user interfaces for defining user defined zones on an image.
Figure 7B:
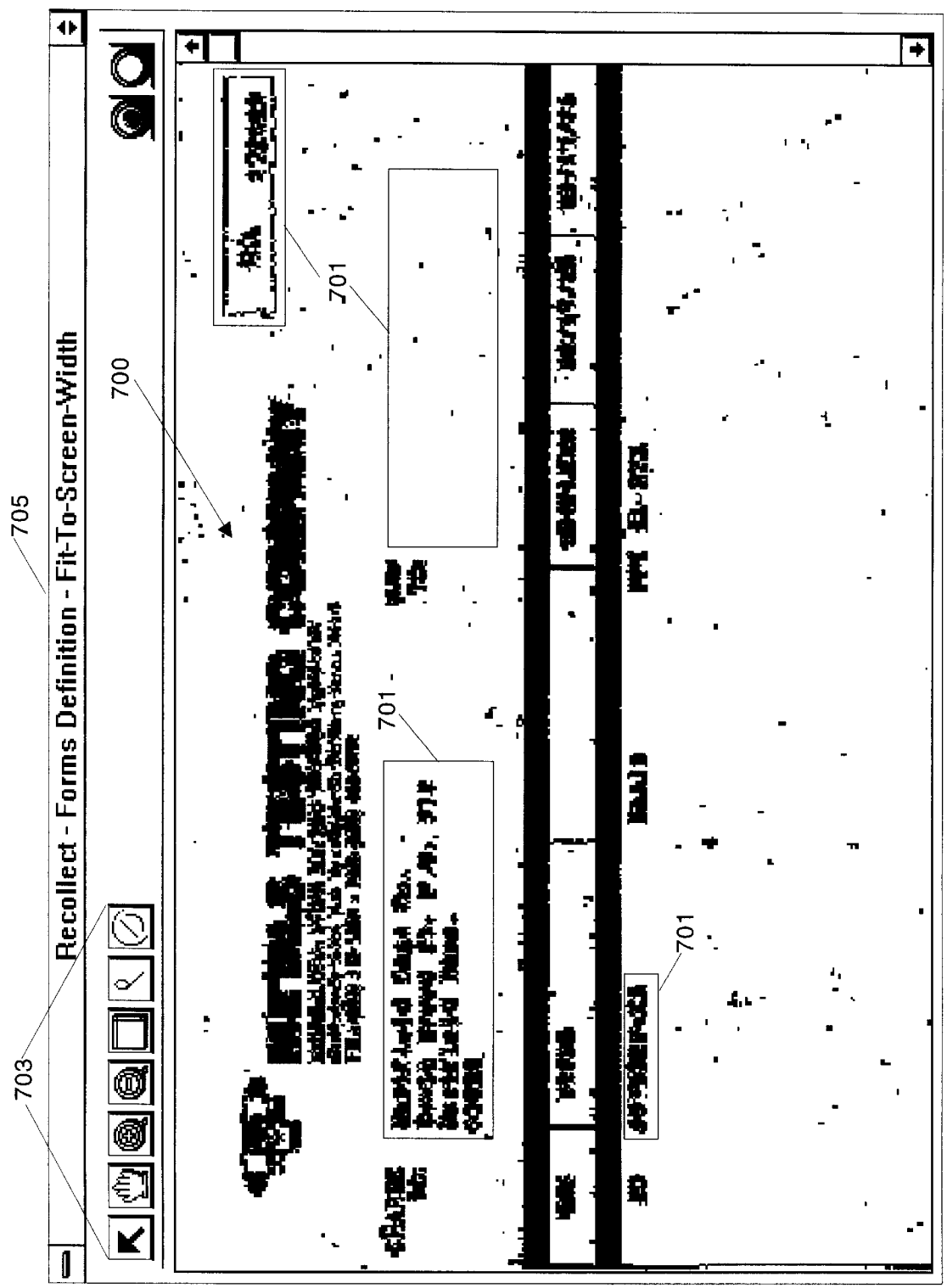

Referring again to FIG. 3, the definition executive 121 provides the deskewed image to the application executive 137, which further presents the deskewed image to the user through a desirable user interface display. The application executive 137 further provides a conventional set of drawing-like tools with which the user can graphically create 311 the user defined zones. This is done by choosing an appropriate drawing tool, such as a rectangle or polygon creation tool, and applying it to the deskewed image to select the individual areas or zones containing the desired text information. FIG. 7a illustrates one example of a suitable user interface 705, showing a deskewed document 700. FIG. 7b illustrates the same document now including a number of user defined zones 701. A palette of drawing tools 703 is also shown, with various graphical tools for selecting the user defined zones 701. Once the user defines a number of zones, the coordinates of the boundary of each of user defined zone is stored, preferably using the coordinates of an upper left hand corner, and a lower right hand corner where the user defined zone is a rectangle. For general polygonal user defined zones, the coordinates of each vertex may also be stored.

F. Data Preparation

Figure 9:
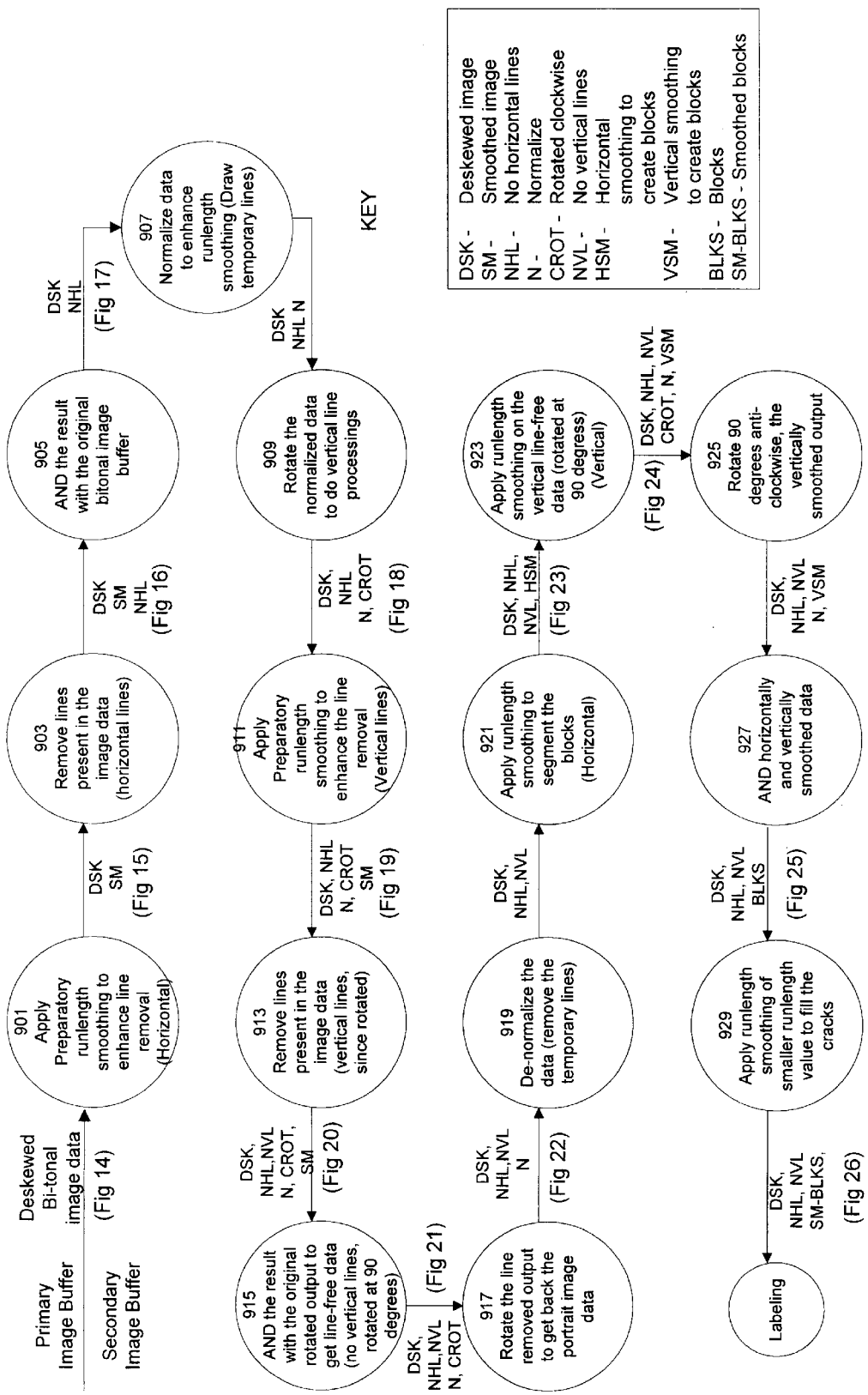
FIG. 9 is a flowgraph of the data preparation process.

Referring again to FIG. 3, the definition executive 121 then invokes 313 the data preparation module 129 to perform a number of tasks on the subsampled image to filter out unnecessary or insignificant elements in the image. This includes smoothing, vertical and horizontal line removal, and formation of blocks. The data preparation module 129 produces an image with smoothed blocks ready for labeling by the labeling module 131. Referring to FIG. 8, there is shown a dataflow diagram of the underlying modules of the data preparation module 129. The data preparation module 129 includes the smoothing module 801, a line removal module 803, a rotate image module 805, and a combination module 807. Referring to FIG. 9 there is shown a flowgraph of the operation of the data preparation module 129. In the figure, text between the process blocks refers to the current status of the processed image. Text above the connecting arrows indicates that the image is in the primary image buffer 141; text below the connecting arrows indicates that the image is in the secondary image buffer 143. A key is provided in the figure for the text abbreviations used. In addition, the text has been labeled to identify a figure showing an example image at the given stage of processing.

Removal of Horizontal and Vertical Lines

The data preparation module 129 invokes the smoothing module 801 to smooth 901 the deskewed image. Smoothing increases the accuracy of the removal of horizontal lines. The smoothing module 801 performs runlength smoothing in a conventional manner, using an input runlength parameter. During scanning, vertical and horizontal lines in a document may be disjointed into a number of broken line segments. This results from variations in brightness/contrast, scanning techniques, orientation of the document and the like. Such broken lines are more difficult to identify and remove at the line removal stage by the line removal module 803. Similarly, a form may contain areas demarcated by dashed or dotted lines, which are also difficult to remove. Accordingly, to increase the accuracy of the line removal module 803, it is desirable to cause such broken, dashed, or dotted lines to form continuous lines. This is done by the smoothing module 801.

The smoothing module 801 is invoked and passed in a runlength parameter, dependent again on the resolution of the subsampled image, that will cause such disjointed lines to be connected by set pixels. In the preferred embodiment, the runlength parameter is set to a maximum of 5, given the preferred resolution of 50 dpi; the runlength parameter would be adjusted for other resolutions. This converts any sequence of 5 or less white pixels into a sequence of black pixels. This pass will connect dotted, dashed or similar lines into continuous line segments. A low runlength value further aids in not deleting the dots used in letters such as "i" and "j", or the crosses on "t", "f" and others.

Figure 15:
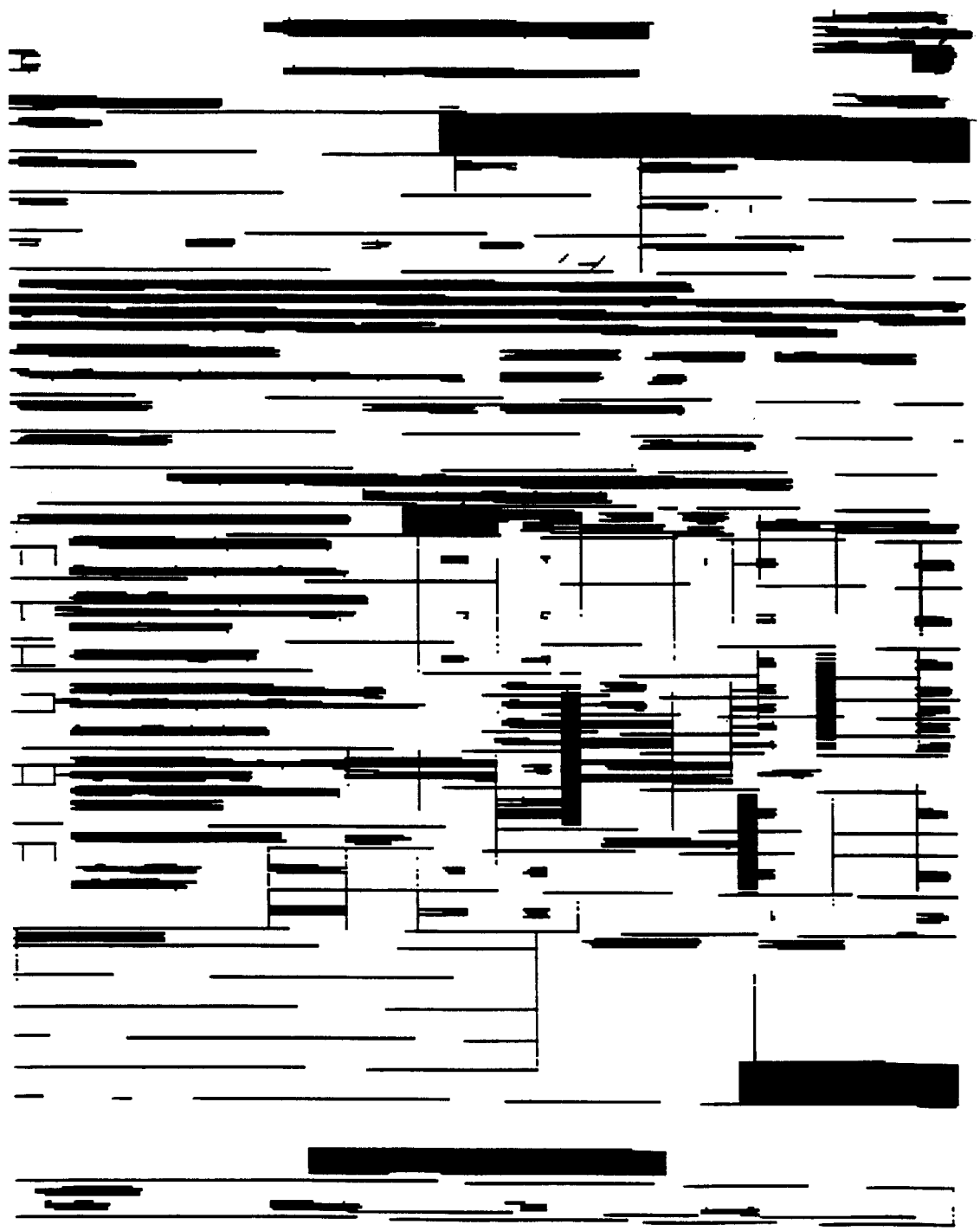
FIG. 15 is an illustration of the image of FIG. 14 following runlength smoothing.

FIG. 15 is an illustration of the image of FIG. 14, following runlength smoothing by the smoothing module 801.

Figure 16:
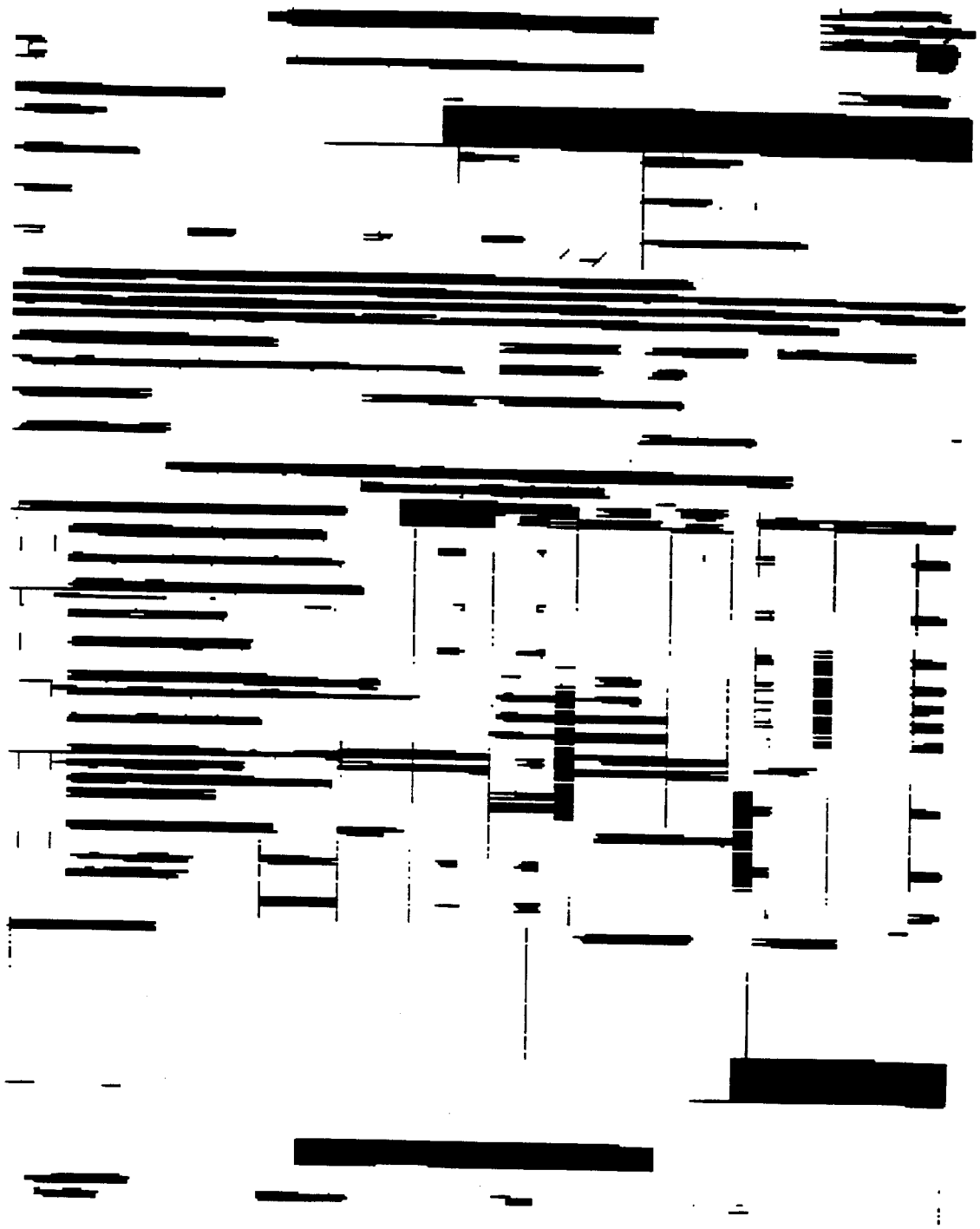
FIG. 16 is an illustration of horizontal line removal on the image of FIG. 15.

The data preparation module 129 then invokes the line removal module 803 to remove 903 horizontal lines in smoothed image. FIG. 16 shows the results of horizontal line removal 903 on the image of FIG. 15. The line removal module 803 scans the image buffer to identify set (black) pixels with a runlength of at least 15. This identifies a potential line segment. The line removal module 803 then checks the second line above the potential line segment to determine either if this line segment has a series of unset pixels for the same runlength as the potential line segment. Alternatively the line removal module 803 may determine the number transitions from set to unset, or unset to set pixels, and compare this value to a predetermined maximum of transitions for a given runlength.

If the foregoing conditional is satisfied, then this indicates the top edge of the potential line segment. The line removal module 803 similarly checks the second line below the potential line segment to identify the bottom of the potential line segment. In this manner the potential line segment can have a maximum height of 3 pixels. If both of these conditions are true, the potential line segment is an actual line segment. The line removal module 803 then removes the line segment by changing all of the set pixels to unset pixels. This process is repeated from the top of the image to the bottom. The resulting image is stored in the secondary image buffer 143. The specific number of lines and line height again is dependent on the resolution of the image, and may adjusted accordingly.

Figure 17:
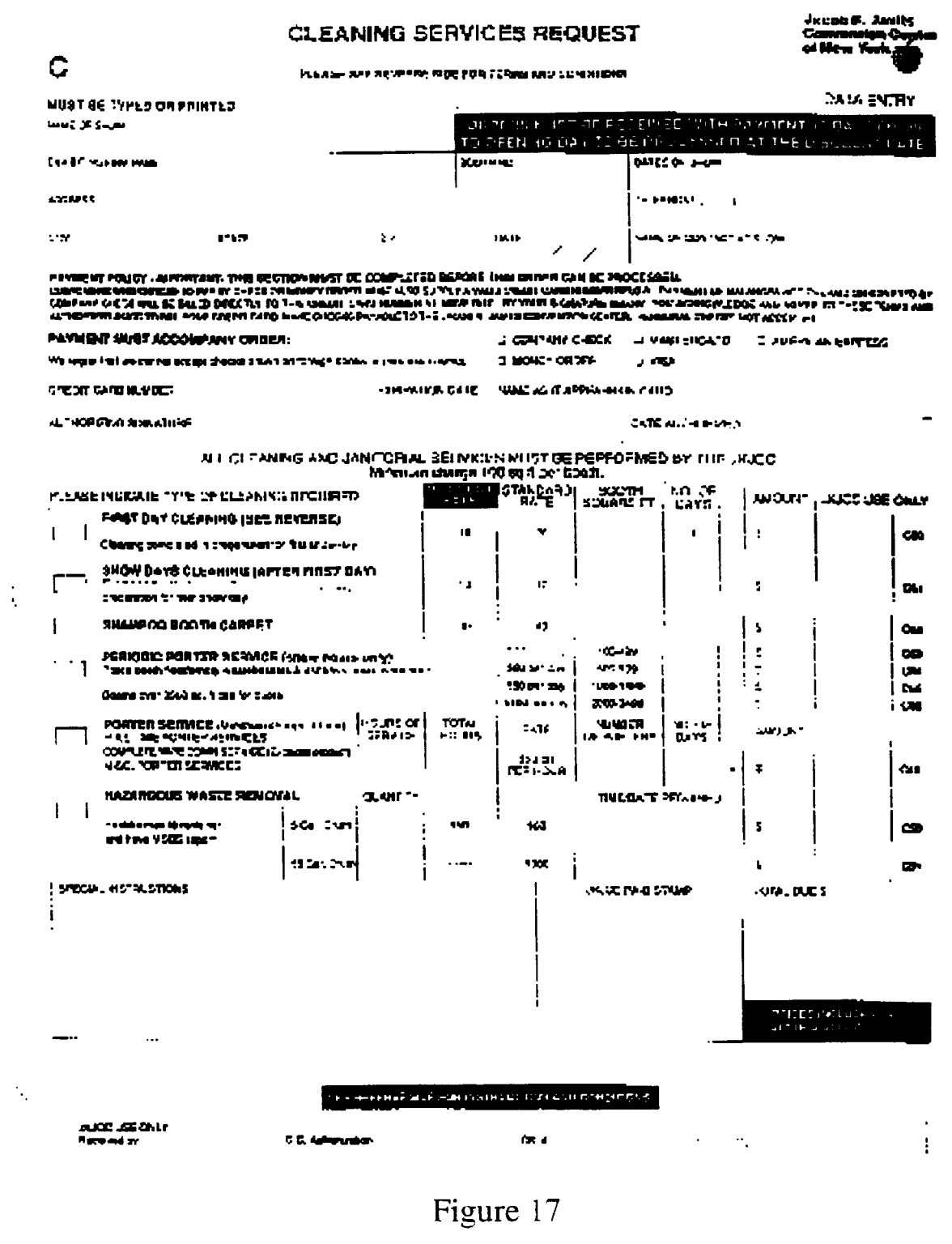

The combination module 807 combines two images in the image buffers 141, 143. This module 807 is invoked by the data preparation module 129 after line removal to produce 905 an image with both vertical and horizontal lines removed. Combination is done by logically ANDing each bit of the two input images. The combination module 807 is invoked after removal of horizontal lines to combine the deskewed bitonal image with the smoothed image without horizontal lines. This results in a deskewed image without horizontal lines. FIG. 17 shows an illustration of a deskewed image without horizontal lines, here the combination of FIG. 14 and FIG. 16.

After horizontal line removal, the data preparation module 129 normalizes 907 the deskewed image without horizontal lines. Normalization is the procedure of drawing temporary horizontal lines (1 pixel wide) at the top of the image and the bottom of the image. This procedure is done to improve accuracy during removal of the vertical lines in the image by clearing demarcating the top and bottom of the image during the smoothing operation. Without the temporary lines, during smoothing, parts of the image may be smoothed across the page boundary. After the vertical lines are removed, the temporary lines are also removed.

Figure 18:
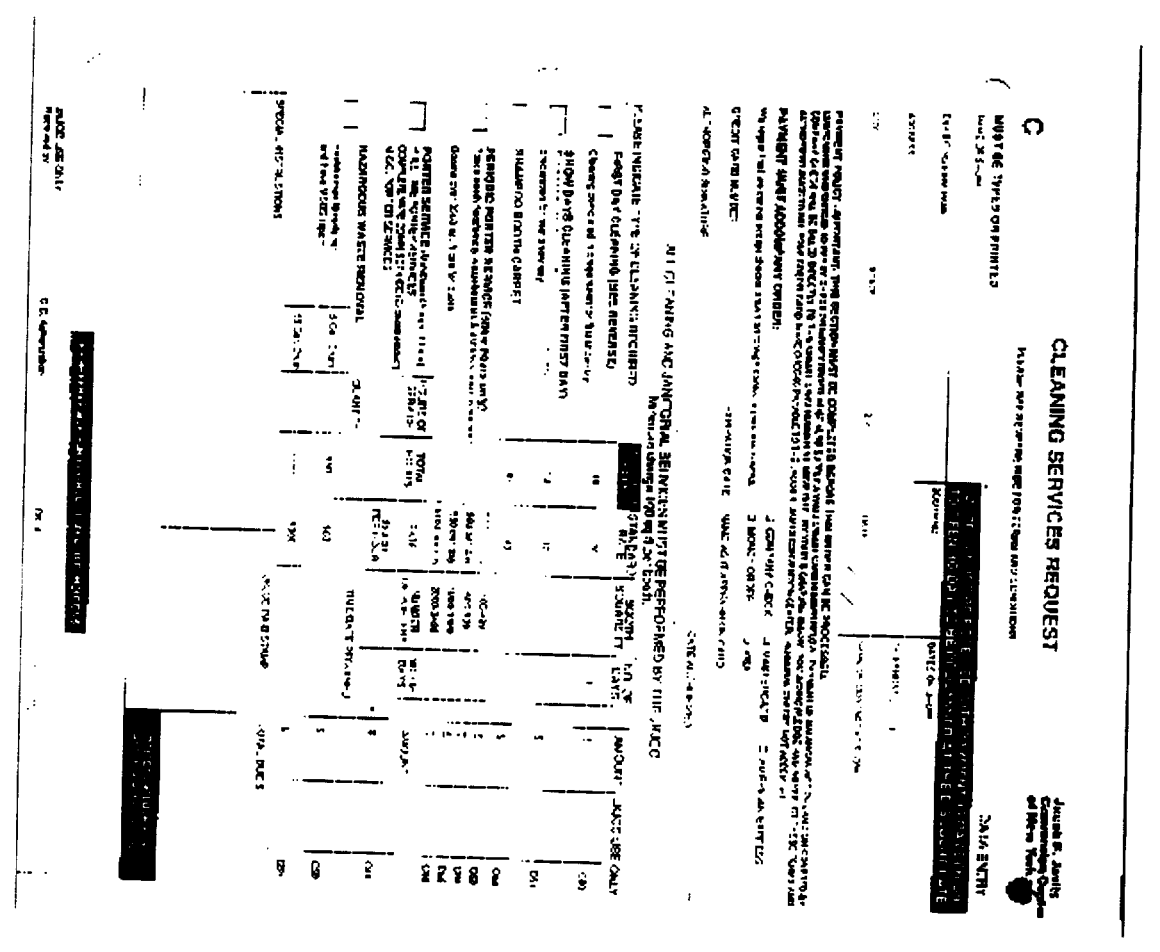

Once normalized, the deskewed image is rotated 90°. This rotation is performed 909 by the rotate image module 805, and is done so that the vertical lines may be removed by the line removal module 803. FIG. 18 shows the normalization and rotation of the deskewed image of FIG. 17.

Figure 19:
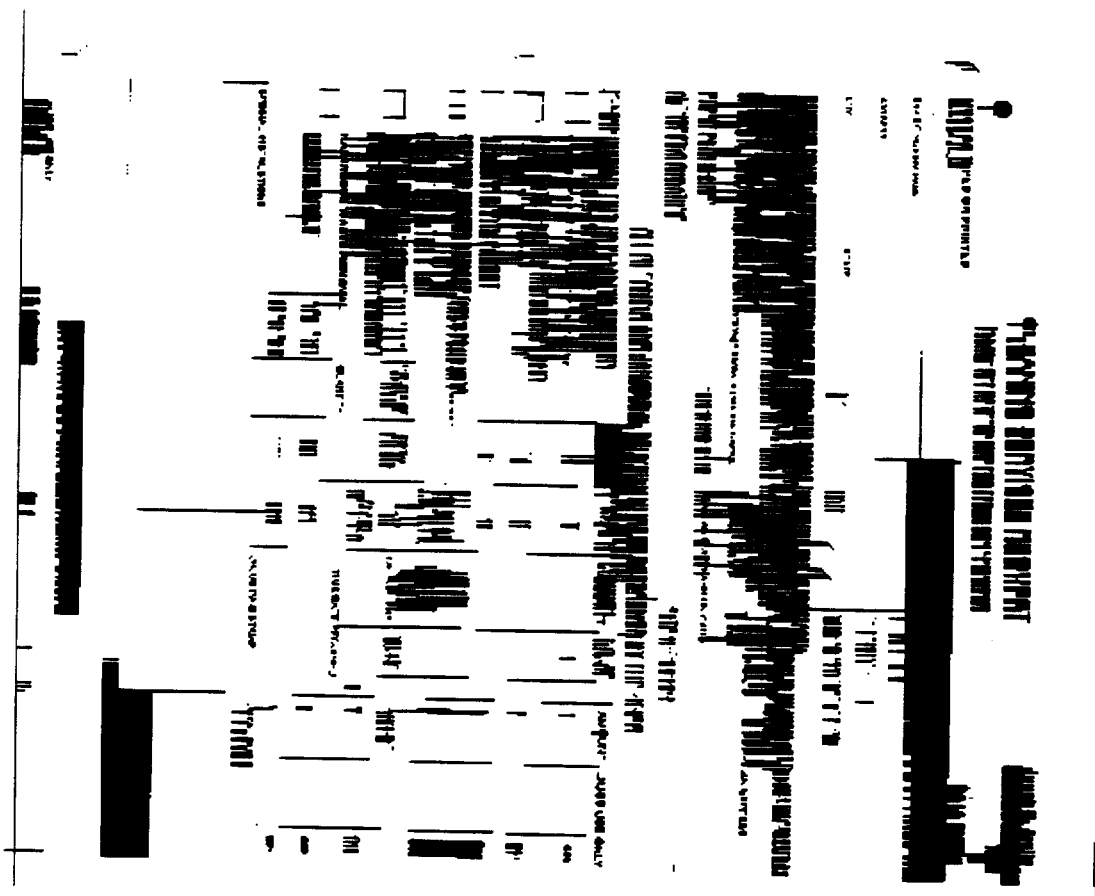
FIG. 19 is an illustration of the smoothed image of FIG. 18.
Figure 20:
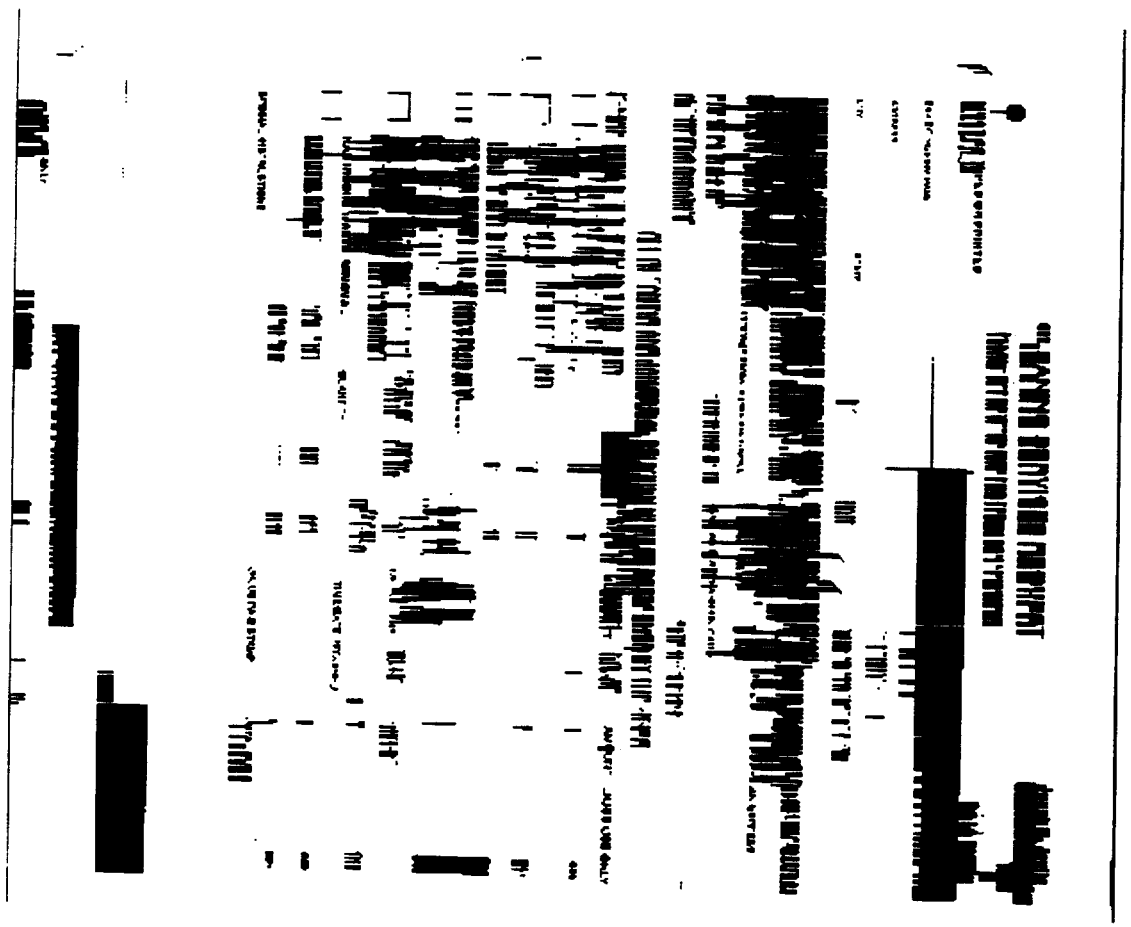
FIG. 20 is an illustration of the results of removing vertical lines in FIG. 19.

The data preparation module 129 invokes the smoothing module 801 to smooth 911 the normalized deskewed image without horizontal lines. FIG. 19 shows the results of smoothing 911 the image of FIG. 18. The line removal module 803 then removes 913 the vertical lines, which are now horizontal lines in the rotated image. FIG. 20 shows the results of removing 913 horizontal (vertical in the unrotated image) lines in FIG. 19.

Figure 21:
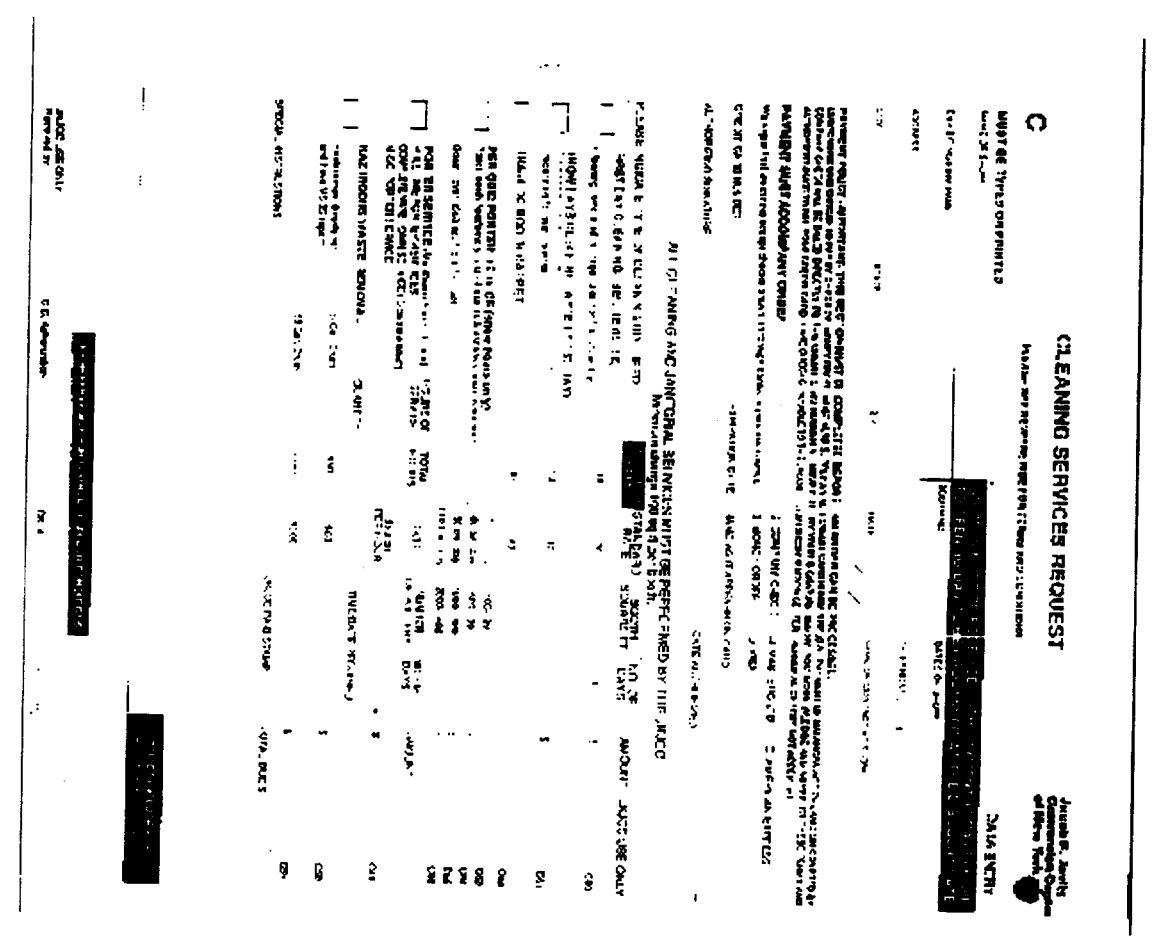

After the vertical lines are removed 913, the image is stored in the primary image buffer 141, separately from the rotated, normalized, deskewed image without horizontal lines in the secondary image buffer 143, resulting from step 909. The combination module 807 is then called to combine 915 the rotated deskewed image without horizontal lines from the step 909, with the smoothed image without the vertical lines, here producing a rotated deskewed image without horizontal or vertical lines. FIG. 21 shows the results of combining the vertical line removed image of FIG. 20 with the deskewed, rotated, normalized image of FIG. 18, thereby producing a deskewed, rotated image without horizontal or vertical lines. The order in which the which the vertical and horizontal lines can be removed may be switched with the appropriate modifications.

Figure 22:
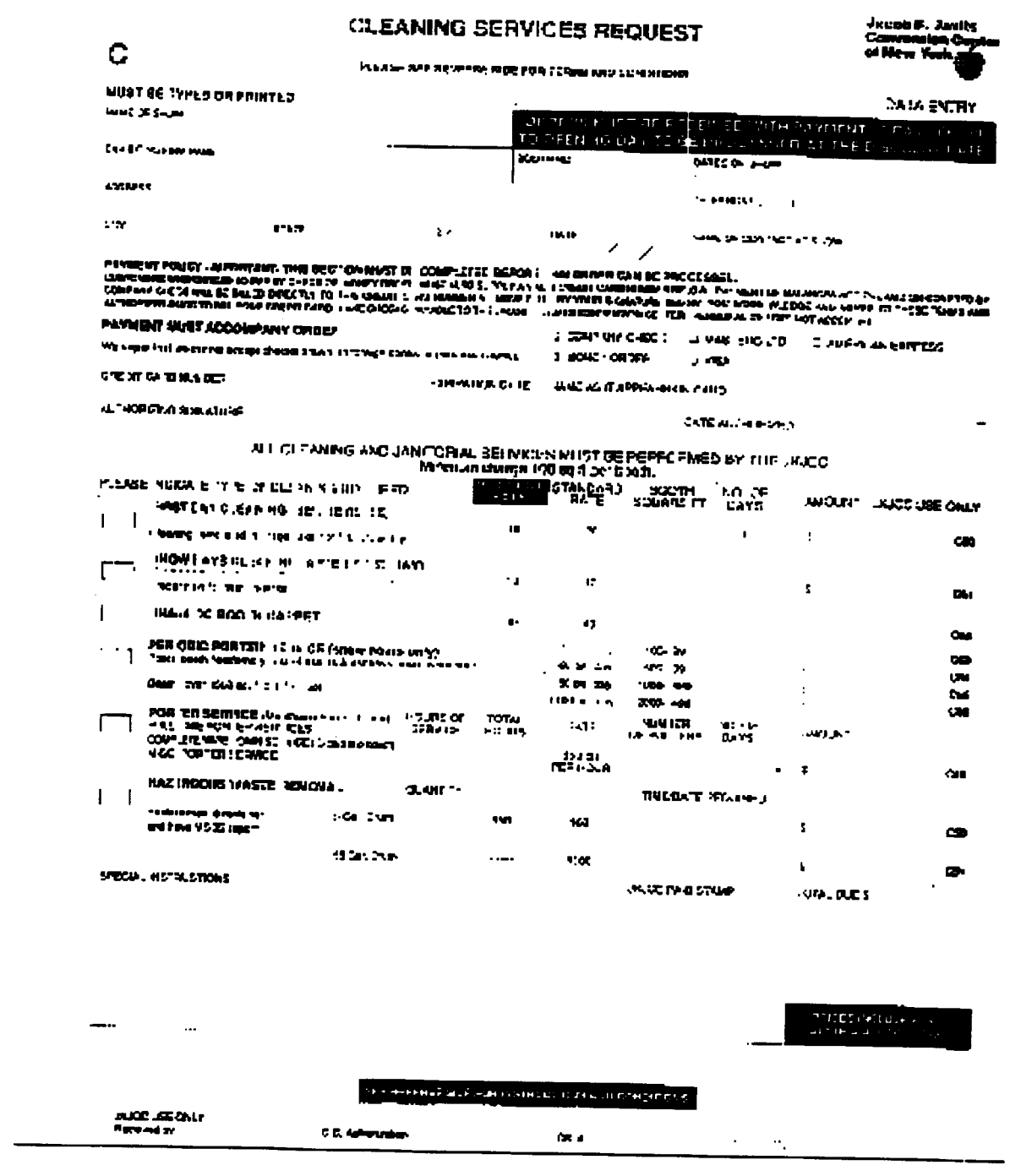

Once the horizontal aimage module lines have been removed, the rotate image module 805 rotates 917 the combined image back to its original orientation. The data preparation module 129 denormalizes 919 the image, and removes the temporary lines introduced during normalization. The result is a deskewed image without vertical or horizontal lines. This image is stored in the primary image buffer 141. FIG. 22 shows the results of rotating back the image of FIG. 21 and denormalizing to remove the top and bottom temporary lines.

Formation of System Blocks

The second major function of the data preparation module 129 is the formation of blocks that can be subsequently considered for labeling as system blocks by the labeling module 131. The blocks are formed as follows.

Figure 23:
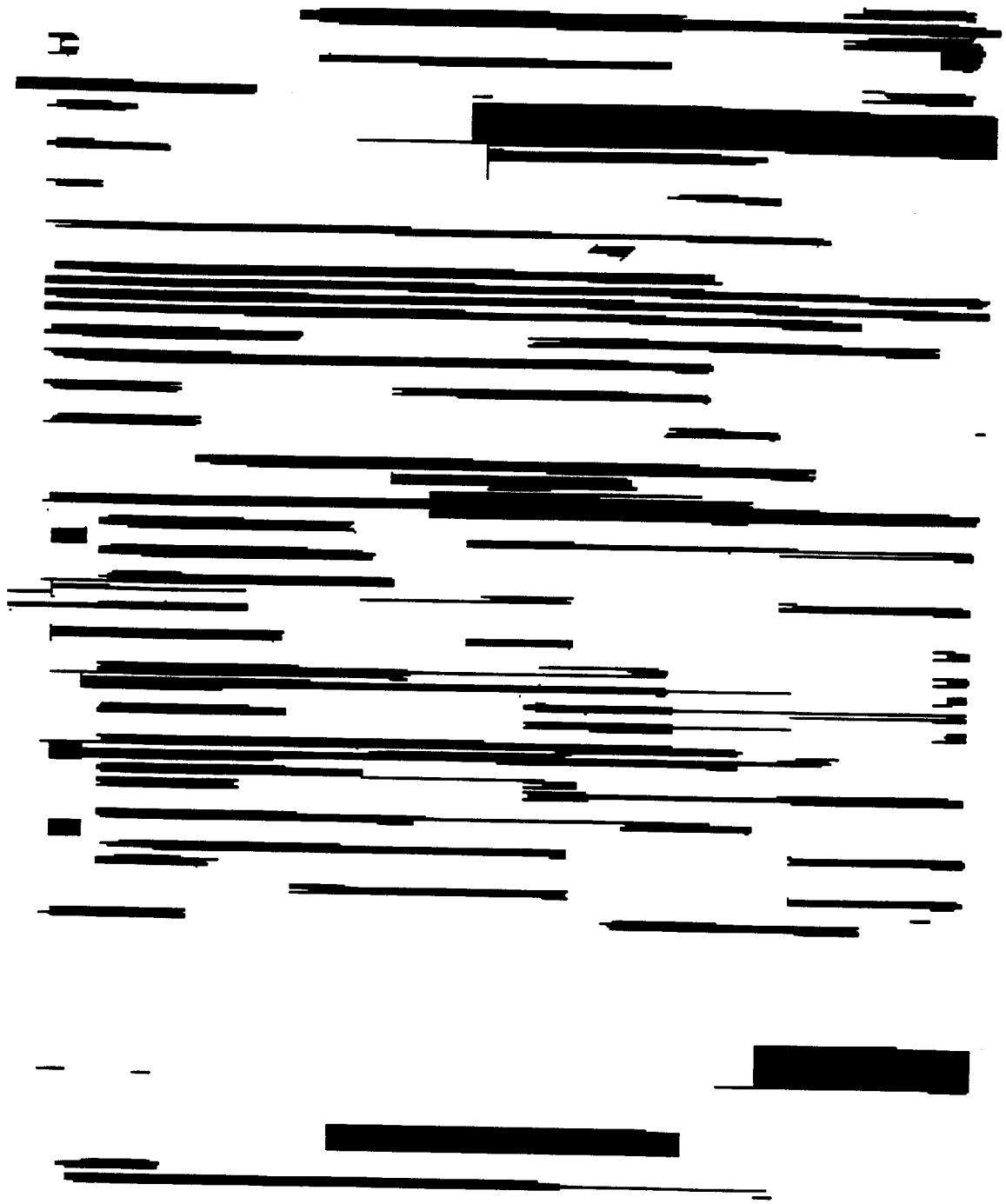
FIG. 23 is an illustration of horizontal smoothing on the image of FIG. 22.

Blocks are formed by a similar series of steps as the line removal process. Horizontal runlength smoothing 921 is performed on the deskewed image without horizontal and vertical lines by the smoothing module 801 with a runlength parameter that will produce large blocks of continuous pixels. In the preferred embodiment, the smoothing operation 921 is performed with a runlength value of about 80 (at 50 dpi) such that white (unset) runlength occurrences of 80 or less pixels along each pixel line are converted or filled with black (set) pixels. The resulting image is stored in the primary image buffer 141. FIG. 23 shows the results of smoothing 921 the image in FIG. 22.

Figure 24:
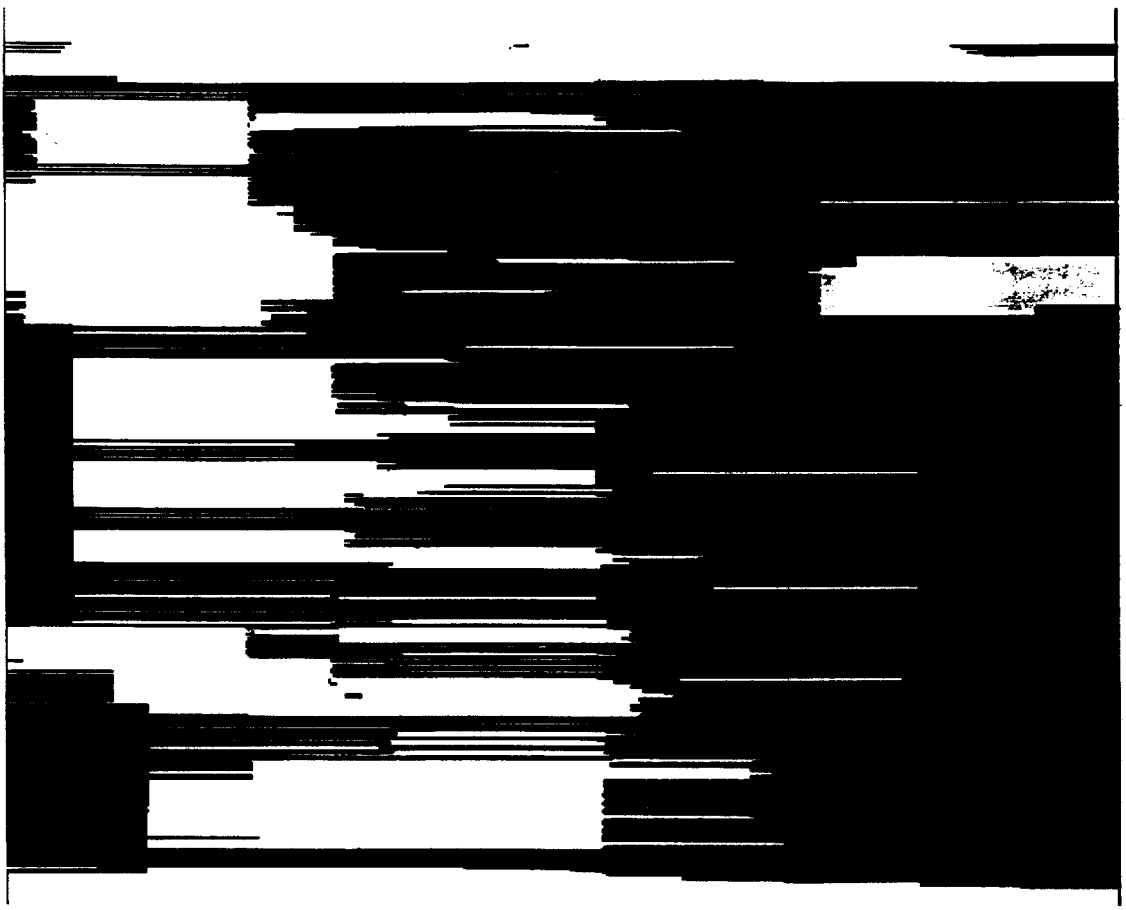
FIG. 24 is an illustration of vertical smoothing on the image of FIG. 21.

Smoothing 923 is then performed on the vertical line-free image data resulting from step 915, which is then stored in the secondary image buffer 143. FIG. 24 shows the results of vertical smoothing on the image of FIG. 21. The vertically smoothed image is then rotated back to a portrait orientation, and stored in the secondary image buffer 143.

Figure 25:
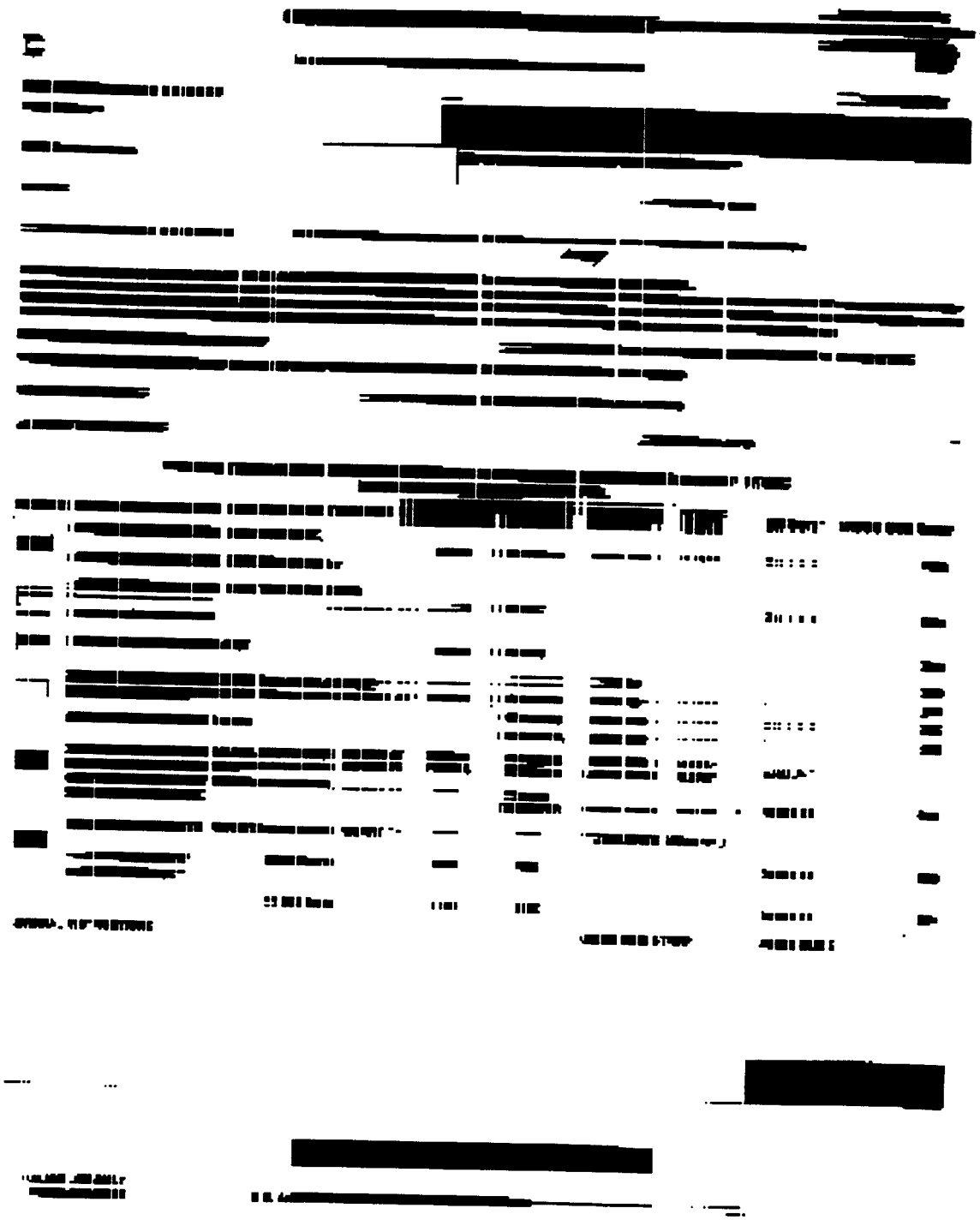
FIG. 25 is an illustration of an image following vertical and horizontal smoothing to form data blocks.

The horizontally smoothed image in the primary image buffer 141, and the vertically smoothed image in the secondary image buffer 143 are combined 925 together by the combination module 807. This process generate a set of data blocks in the image. FIG. 25 shows the combined results of horizontal and vertical smoothing to produce data blocks, here the combination of FIG. 23 and FIG. 24 (following rotation).

Figure 26:
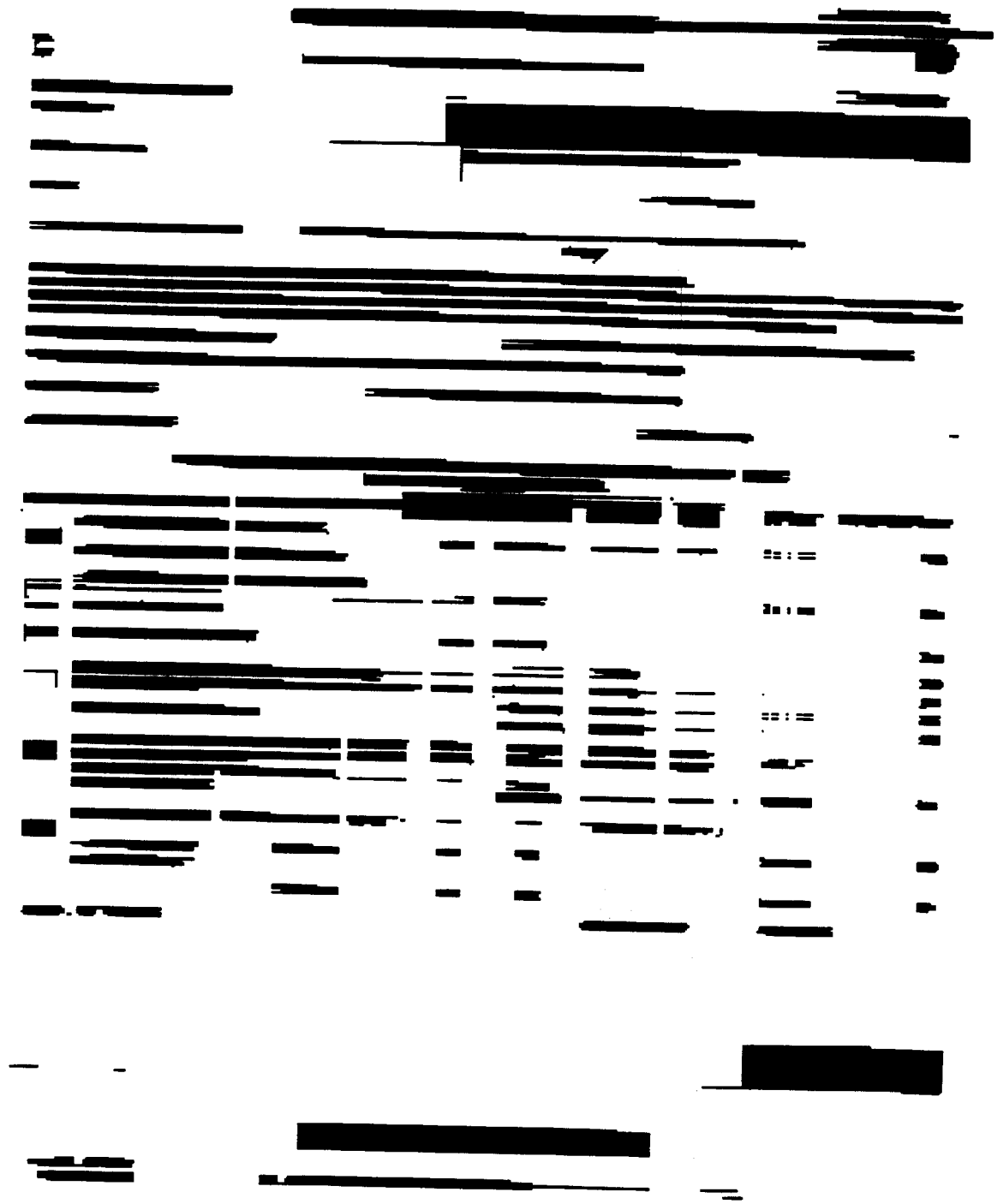
FIG. 26 is an illustration of further smoothing on the image of FIG. 25 to refine the data blocks therein.

In some instances there may be some small gaps in the output which may have to be smoothed further. Further smoothing 927 of the resultant data is performed with a runlength value of 3 pixels, thereby eliminating these residual elements. The resultant image is stored in the primary image buffer 141, and contains the blocks ready for processing by the labeling module 131. FIG. 26 shows the results of smoothing 927 to eliminate residual elements in FIG. 25.

G. Labeling & Classification of System Blocks

Referring again to FIG. 3, following data preparation, the blocks are labeled and classified 315 by the labeling module 131. Generally, the labeling module 131 analyzes the blocks created by the data preparation module 129, identifying each block with a unique block identification number and classifying each block as either a text block, an image block, or a dual block. Text blocks are those blocks that are probably generated by the presence of text areas on the original image. Image blocks are those blocks that are probably generated by the presence of graphics or pictures in the original image. Dual blocks are those blocks that are not identifiably either text or image blocks. Each group of connected block are assigned a unique block identification number.

The labeling module 131 maintains a list of block identification numbers, each corresponding to a block, and for each block identification number further stores statistical and classification data about the block. In the preferred embodiment, the block identification list is an array of block structs, each block struct having attributes for block identification number, and other data values as further described below.

The labeling module 131 preferably employs a 4 pixel-connnectivity tracing technique to determine whether a selected pixel is connected to its neighboring pixels. Such collections of pixels collectively form clusters, thereby contributing to the formation of a type of block. For each block that is formed, various features are extracted in order to discriminate them as unique blocks belonging to one of the block types.

Block Identification and Labeling

Figure 10:
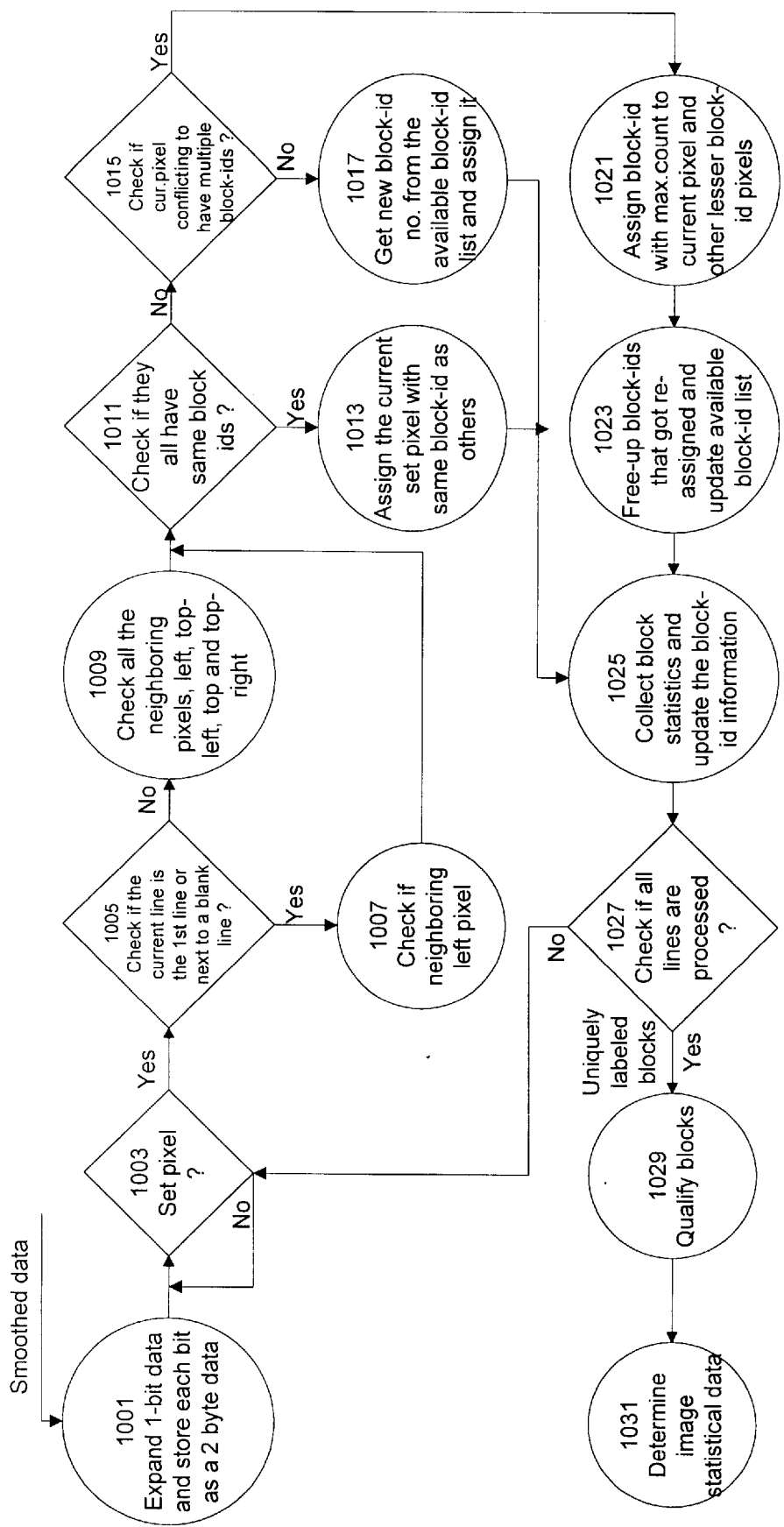
FIG. 10 is a flowgraph of the block identification process of the labeling module.

Referring now to FIG. 10 there is shown a flowgraph of the process of block identification by the labeling module 131. The labeling module 131 receives from the data preparation module 129 via the primary image buffer 141, the smoothed image without horizontal or vertical lines, along with a list of the blocks and their identification values. The labeling module 131 expands 1001 each bit in the image, as described above, to a 2 byte representation. The additional bit width will be used to store information about the identified system blocks. The expanded data is stored in the addressable memory 113.

The labeling module 131 scans 1003 the expanded data of the image to identify set pixels. Only the bit in the expanded data that corresponds to actual image data is checked. This scanning processes proceeds from left to right, top to bottom; a count of the number of lines (based on resolution), and in the image is maintained to determine when the entire image is scanned.

If a set pixel is located, the pixels immediately adjacent to the set pixel in the same and previous line that have already been checked (thus the left, top-left, top, and top-right) are checked 1009 to determine 1011 if they all have the same block identification number. If so, then the set pixel is assigned 1013 the same block identification number. The labeling module 131 determines 1005 if the current line is the first line in the image or next to a blank line. If so, then only the pixel to the immediate left is checked, as above.

If the block identification numbers are different among the neighboring pixels, then the labeling module 131 determines 1015 whether the set pixel has multiple block identification numbers. If so, then the labeling module 131 will assign 1021 to the pixel the block identification number held by the largest number of the neighboring pixels. Also, any other neighboring pixels will have their block identification number changed as well to this block identification number. The block identification numbers are assigned from the list of available block identification numbers. The block identification number of the changed pixels is thus added 1023 back into the list of available block identification numbers. Each block identification number is thus associated with one set of connected pixels.

Once the block identification number is assigned, a number of statistics on the block identification numbers are updated 1025. In particular, labeling module 131 maintains for each block identification number:

- the number of set pixels present in the image buffer that have the block identification number (NUMB);
- the spanning area of the block, as determined by the top-left, and bottom right set pixels of the block (AREA);
- the number of set-to-unset transitions (scanning left to right/top to bottom) in the block (TRANS);
- the height of the block, as the difference between the y-axis coordinates of the top-left, and bottom right set pixels of the block (HEIGHT);
- the width of the block as the difference between the y-axis coordinates of the top-left, and bottom right set pixels of the block (WIDTH);
- a run factor determined by the quotient of NUMB/TRANS, the run factor indicates the average runlength of set pixels in the block (RUN);
- an aspect ratio determined by the quotient of WIDTH/HEIGHT (ASPECT); and
- a density factor determined by the quotient of NUMB/AREA, the density factor indicates the average number of set pixels per pixel in the block (DENSITY).

These data values are updated 1025 with each scanned pixel.

The labeling module 131 determines 1027 whether all lines in the image have been processed. If not, the labeling module 131 continues to scan 1003 the expanded data. If so, then all distinct, separate blocks of connected pixels have been identified, and provided with a block identification number, and each block identification number applies only to one group of connected pixels.

Once all of the blocks have been assigned block identification numbers, the labeling module 131 qualifies 1029 selected blocks for determining average block data for the entire image. Qualified blocks are those that have an adequate size and shape to be readily identifiable by the system. In the preferred embodiment, using 50 dpi images, qualified blocks meet the following criteria:

HEIGHT/RUN>4.00
HEIGHT<=22 lines
ASPECT>=5.00
DENSITY>=0.5

Each block is checked 1029 against these criteria, and the list of block identification numbers is updated to indicate whether the block is qualified. The values are related to the preferred resolution, and in other embodiments, other criteria may be employed.

From the qualified blocks, an average height and average runlength is computed 1031. The average height is determined by summing the heights of the qualified blocks, and dividing by the number of qualified blocks. The average runlength is similarly determined.

Figure 27:
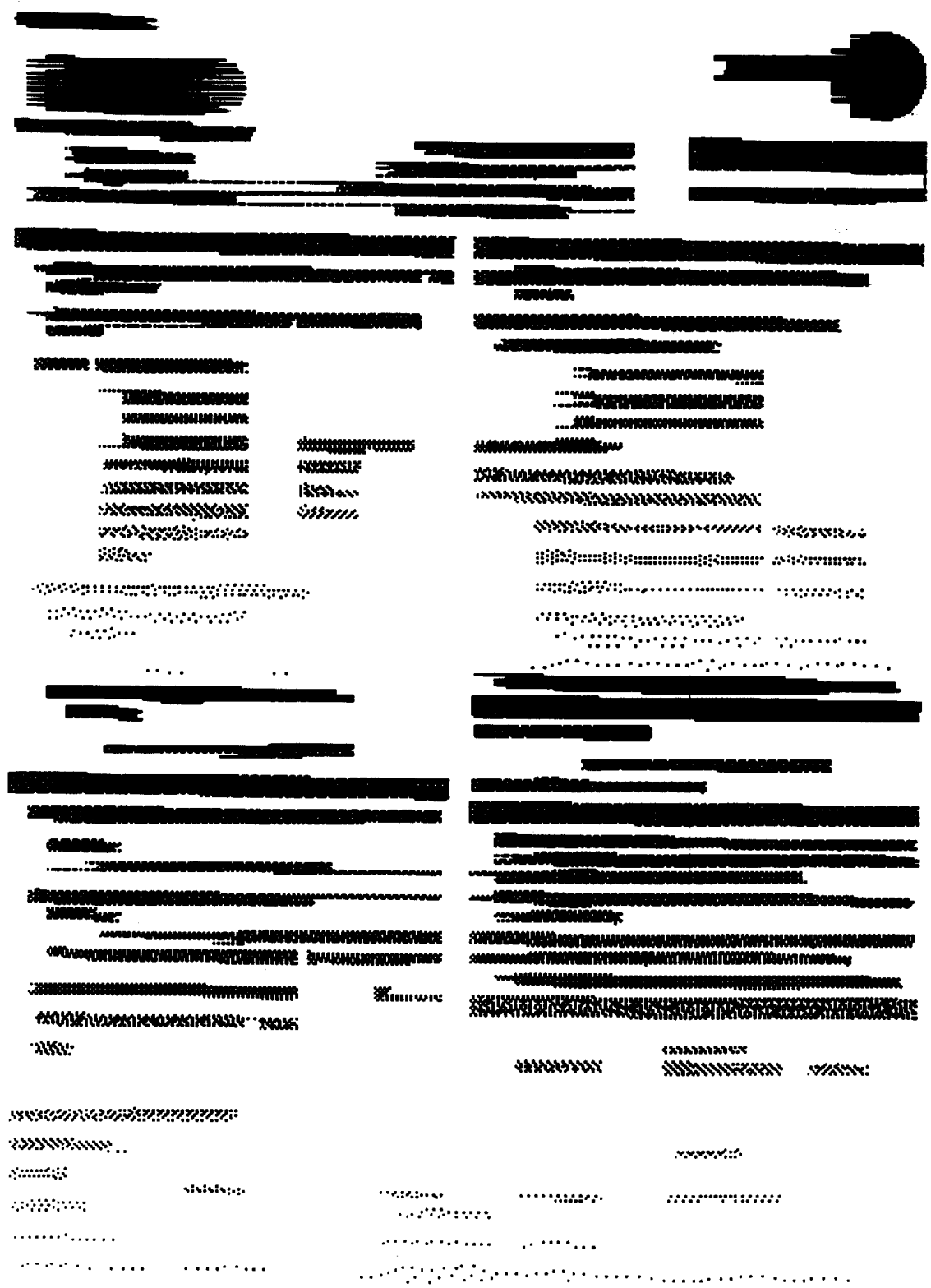
FIG. 27 is a schematic illustration of the results of labeling the data blocks in the image of FIG. 26.

FIG. 27 shows as a schematic example of the results of labeling on the image of FIG. 26. In the image of FIG. 27, blocks that have the same pixel density pattern have been labeled as part of one block, and have the same block identification number.

Block Classification

Figure 11:
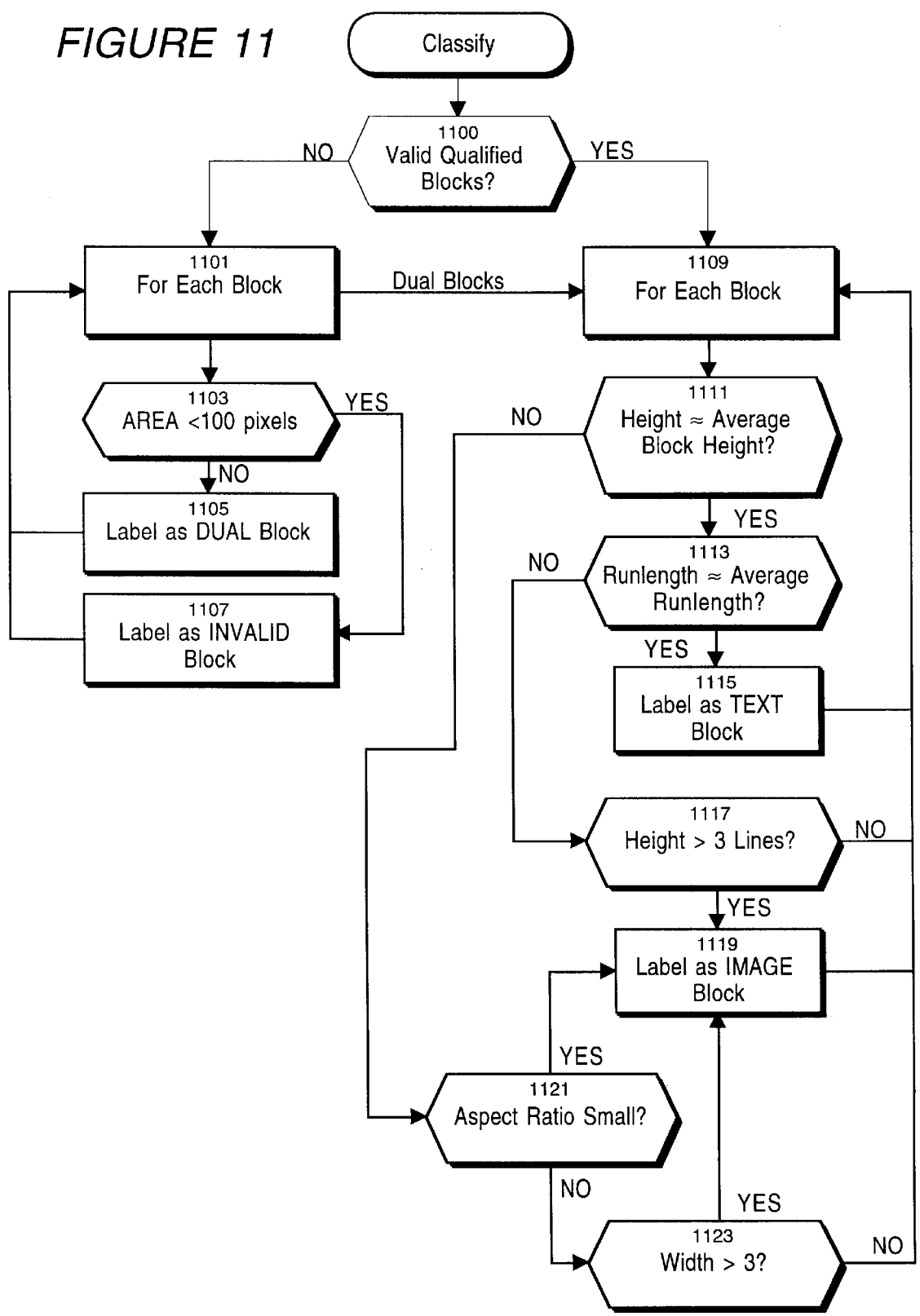
FIG. 11 is a flowgraph of the data type classification process.

The labeling module 131 then continues to determine the data type of each block (both qualified, as above and not qualified), whether it is text, image, or dual. Referring to FIG. 11 there is shown a flowgraph of the data type classification process of the labeling module 131.

The labeling module 131 tests 1100 whether there are any qualified blocks resulting from the qualification process. If not, then the labeling module 131 segregates all blocks into invalid blocks and dual blocks. The labeling module 131 loops 1101 over the block list and determines 1103 for each block whether the area (AREA) is less than 100 pixels (assuming 50 dpi). If so, then the block is an invalid block, and processing continues. If the area is greater than 100 pixels, then the block is classified 1105 as a dual block. In each case the block list is updated with the assigned values.

Once the blocks are initially segregated, or if there are any qualified blocks then the labeling module 131 determines whether the blocks are text or image blocks, or simply indeterminate. This is done by looping 1109 over the list of qualified or dual block blocks, and for each block, determining 1111 whether the height of the block is within a particular range of block heights from the average block height of the image. In the preferred embodiment, where the preferred image resolution is 50 dpi, the test is whether the height of each block is less or equal to four times the average block height. Other approximate ratios may be used with other image resolutions.

If the block height is within the desired range, this indicates a small to medium size block that may be either text or image data. Accordingly, the labeling module 131 further determines 1113 the runlength (RUN) of the block with respect to the average runlength of the all the qualified blocks. In the preferred embodiment, if the block runlength is less than about six times the average runlength plus an adjustment factor of two, then the block is a text block, and the block identification list is updated 1115 accordingly. This effectively tests whether the block has the area and length common to text blocks once smoothed by data preparation. Blocks meeting these various tests are probably text blocks and so classified.

If the runlength exceeds this value, then the block may still be an image block or indeterminate, in which case it remains classified as a dual block. Accordingly, the labeling module 131 tests 1117 whether the height (HEIGHT) of the block is greater than three lines (again, assuming a 50 dpi image; this value should be scaled with other resolutions). Since most text blocks are less than this amount, if the height exceeds this value, the block is likely an image block, and so the block identification list is updated 1119 accordingly. If not, then no further classification is performed, and the block remains classified as a dual block.

Returning then to the conditional 1111, where the height of the block is greater than about four times the average block height, the block is probably an image block, but further tests are applied to verify this classification. The labeling module 131 determines 1121 whether the aspect ratio (ASPECT) of the block is greater than or equal to about 0.2. If so, this indicates that the block has the approximate width to height common in most images; any smaller value would indicate a very narrow block that is unlikely to be an image. Accordingly, the labeling module 131 will update 1119 the block list to indicate an image block. If this test fails, then the labeling module 131 determines 1123 whether the width of the block is greater than 3 pixels. If it is, then the block is again classified 1119 as an image block. Otherwise, the block remains classified as a dual block.

At the end of the labeling and classification processes, the blocks in the image have been distinctly identified and typed as either text, image, or dual blocks. The resulting set of blocks are 'system blocks,' and will be used to define the structure of the template.

H. Creation of Dynamic Data Network

Figure 12:
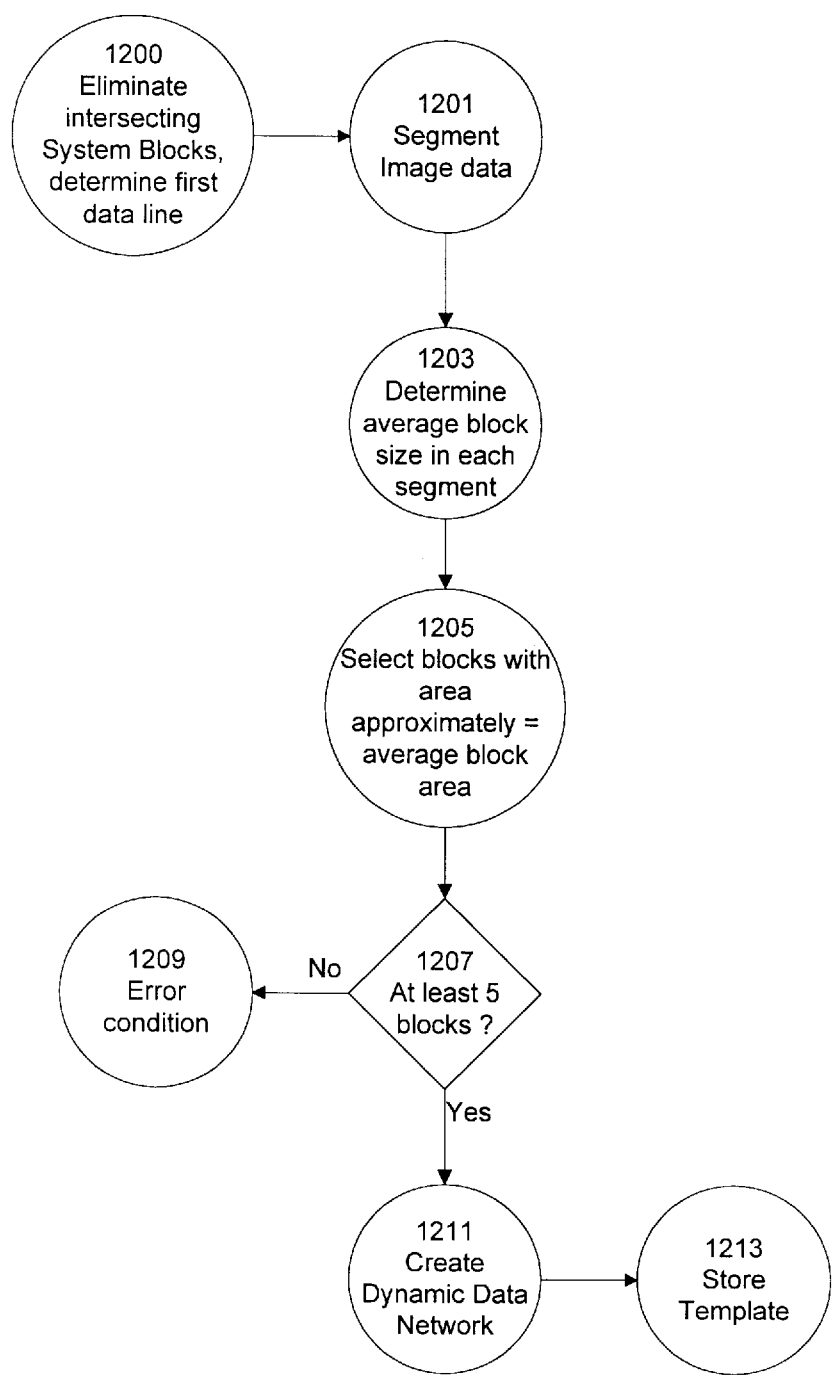
FIG. 12 is a flowgraph of the process of creating the dynamic data networks.

Referring again to FIG. 3, the dynamic data networks that describe the structure of a template are defined 317 from the valid, labeled, classified blocks. Referring now to FIG. 12, there is shown a flowgraph of the process of creating the dynamic data network of template by the template module 133.

The template module 133 determines 1200 whether any of the system blocks intersect any of the user defined zones. These system blocks are eliminated from further processing. The template module 133 also determines the first line of the deskewed, subsampled image in which a set pixel occurs, and the last line in which a set pixels occurs. These lines determine the area of the image where any data is present, thereby eliminating unnecessary processing of the image area outside of these lines.

The template module 133 segments 1201 the image data between the first and last line into a number of zones having equal area. Segmenting the image into segments allows for normalizing the block size in each segment, such that large blocks do not overly influence the selection of blocks for the dynamic data network. By using segments, blocks in each zone of the image will be used in the template, resulting in a more robust template. In the preferred embodiment, the image is segmented into fifteen segments, dividing the image top to bottom.

In each segment, template module 133 determines 1203 the average area of the text blocks, and separately, the image blocks in the segment. The average area of each block type in each segment is then stored. The template module 133 then selects 1205 in each segment those blocks with an area approximately equal to the average block area of the segment, with respect to the block type. In the preferred embodiment, selected blocks are within ±20% of the average block area of their type. Alternatively, a block with an area less than and next to (in an ordered list) the average block size, and a block with an area greater than and next to the average block size may be selected. For example, assume the blocks in a segment have areas of 104, 100, 118, 132, 138, 102, and 128 sq. pixels, and the average block area is 120 pixels. Then the selected blocks would be those with 118 and 128 sq. pixels. This selection is done for both image and text blocks, resulting in four blocks in each segment.

The template module 133 then determines 1207 if there are least five blocks selected. If so, a dynamic data network for the template can be created. From experimentation it was determined that a minimum of five blocks are preferred to create a dynamic data network. If five blocks are not selected, the template module 133 indicates 1209 to the form processing definition executive 121 that template definition has failed.

If there are more than five blocks for the entire image, the dynamic data network for the image is created 1211. The dynamic data network comprises a list of vectors between the system blocks meeting the average size requirement, preferably between their centroids. More particularly, for each system block a vector is defined from the centroid of the system block to the centroid of every other system block. Accordingly, for each system block $B_i$ (i=1 to n, where n is the number of system blocks) there is a vector list $V_i$, containing vectors $v_{(i,j)}$ between system block $B_i$ and system blocks $B_j$:

$$V_i = [v_{(i,j)}, v_{(i,j+1)}, \ldots v_{(i,n)}]$$

In the preferred embodiment each vector is preferably defined as the distance between the centroids of the system blocks, and a direction.

$$v_{(i,j)} = [\sqrt{(x_i - x_j)^2 + (y_i - y_j)^2}, (B_i \rightarrow B_j)]$$

where $(B_i \rightarrow B_j)$ indicates the direction of the vector from system block $B_i$ to system block $B_j$.

Other vector definitions may also be used, so long as a vector invariantly associates one system block with another. For example, each vector may be stored as the coordinates of its end points:

$$v_{(i,j)} = [(x_i, y_i), (x_j, y_j)]$$

from which distance and orientation may be computed as needed.

The dynamic data network D for the image includes the set of vector lists V for the system blocks:

$$D = [V_1, V_2, V_3, \ldots V_n]$$

Figures 28A, 28B:
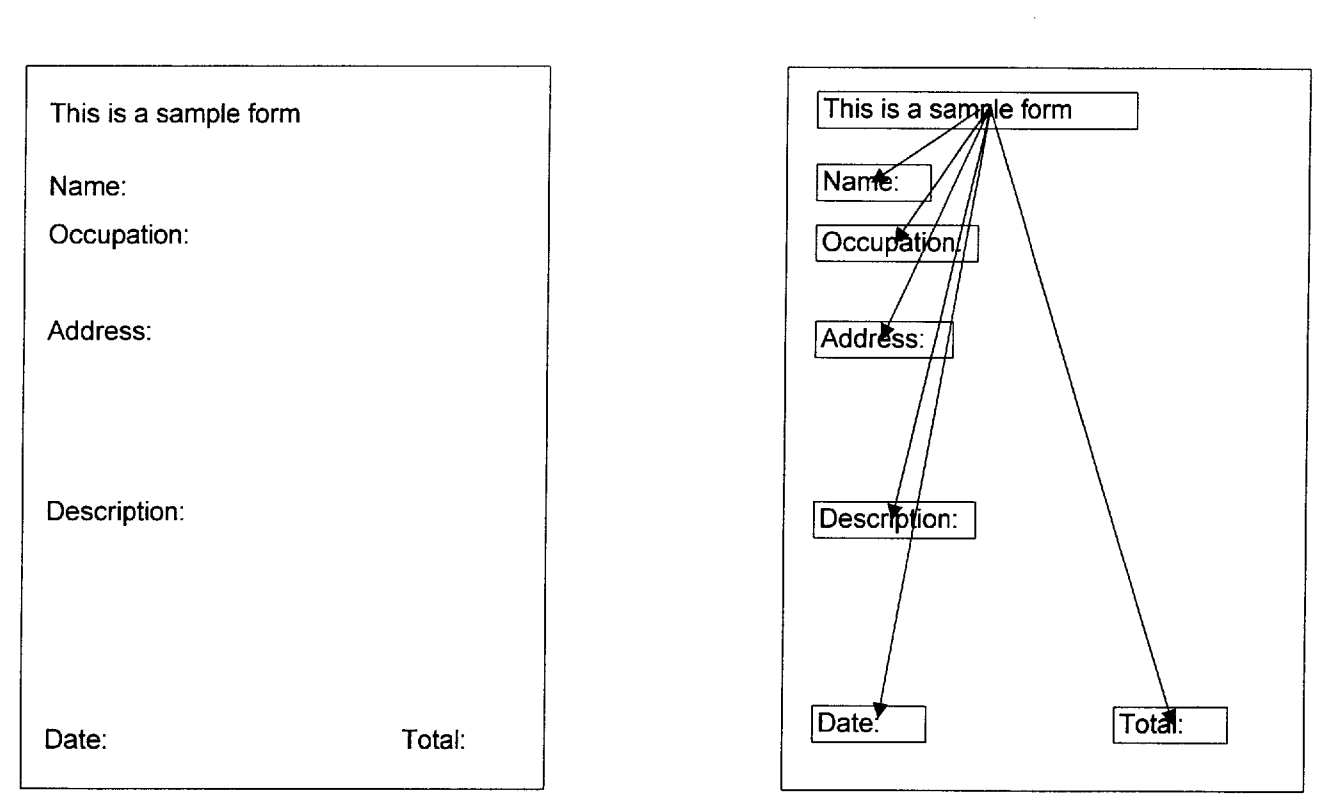
Figures 28C, 28D:
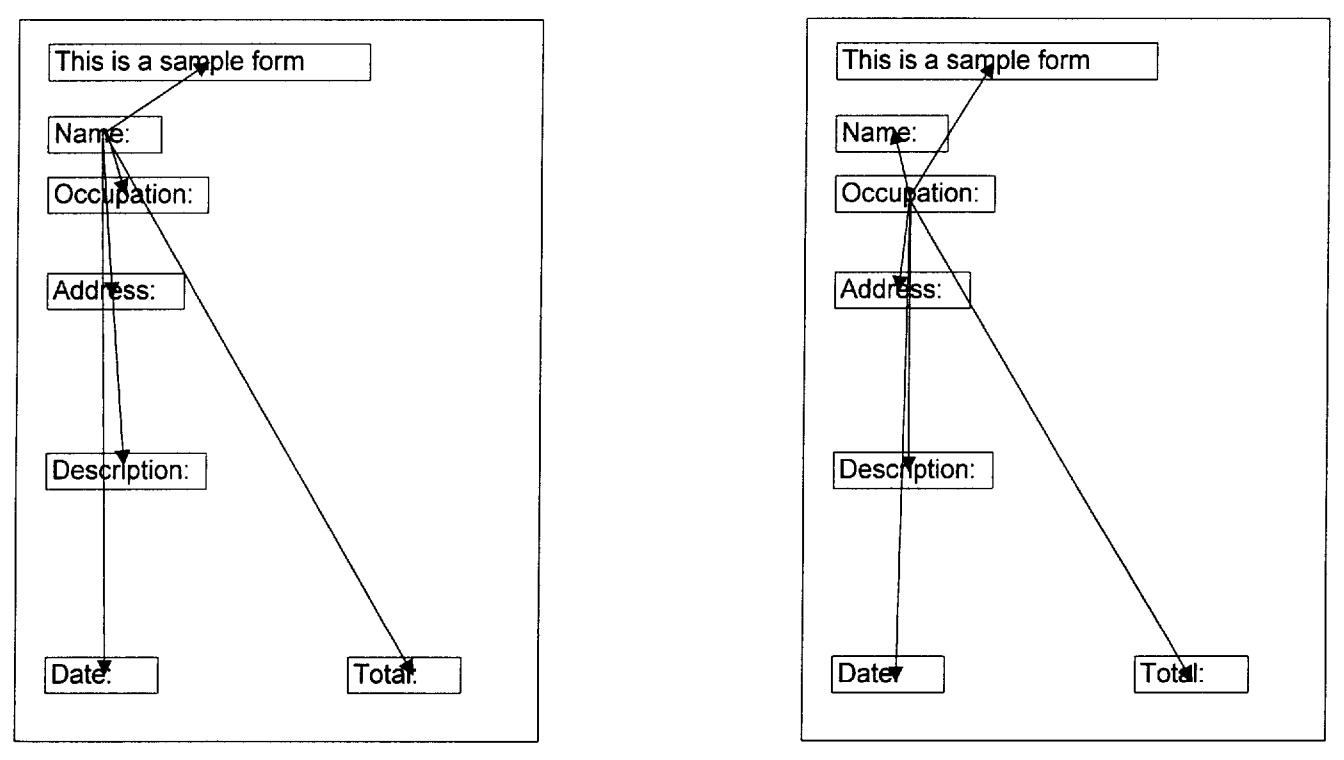
Figures 28E, 28F:
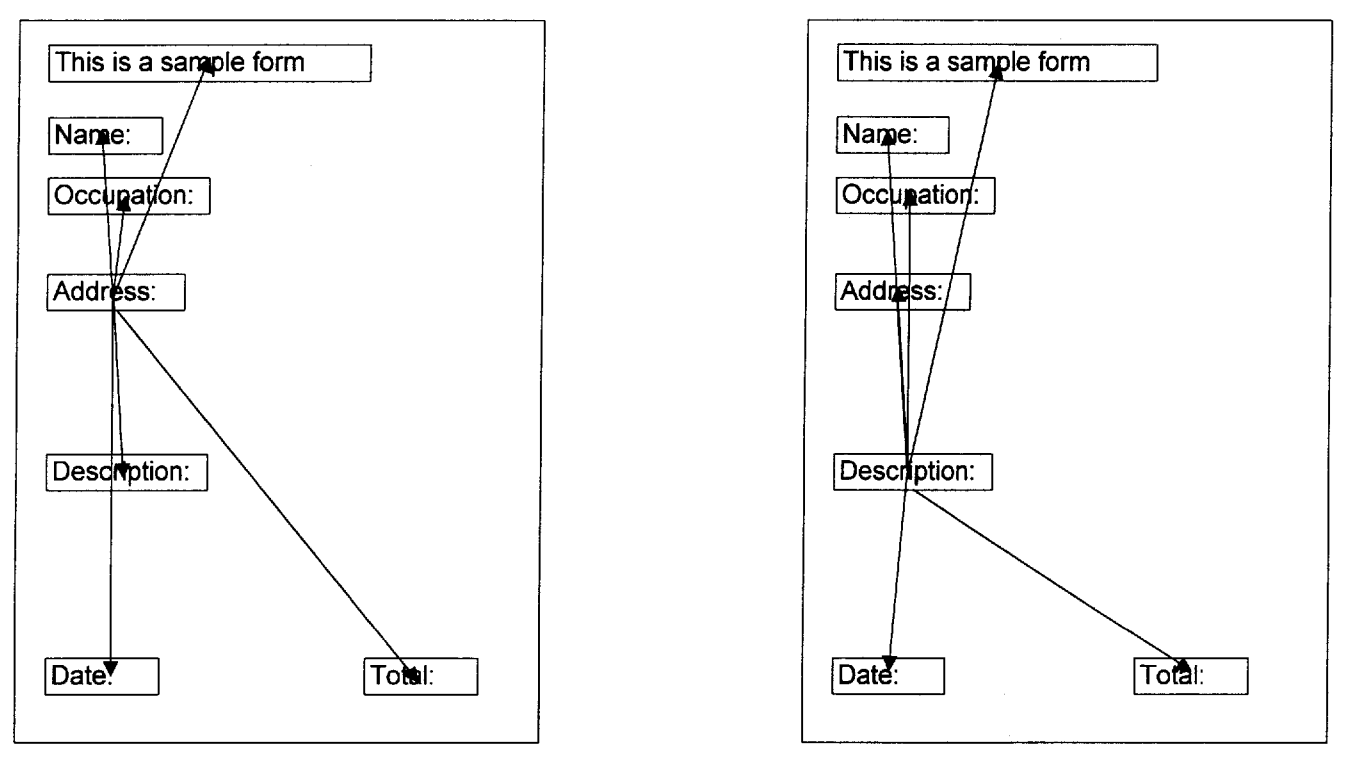
Figures 28G, 28H:
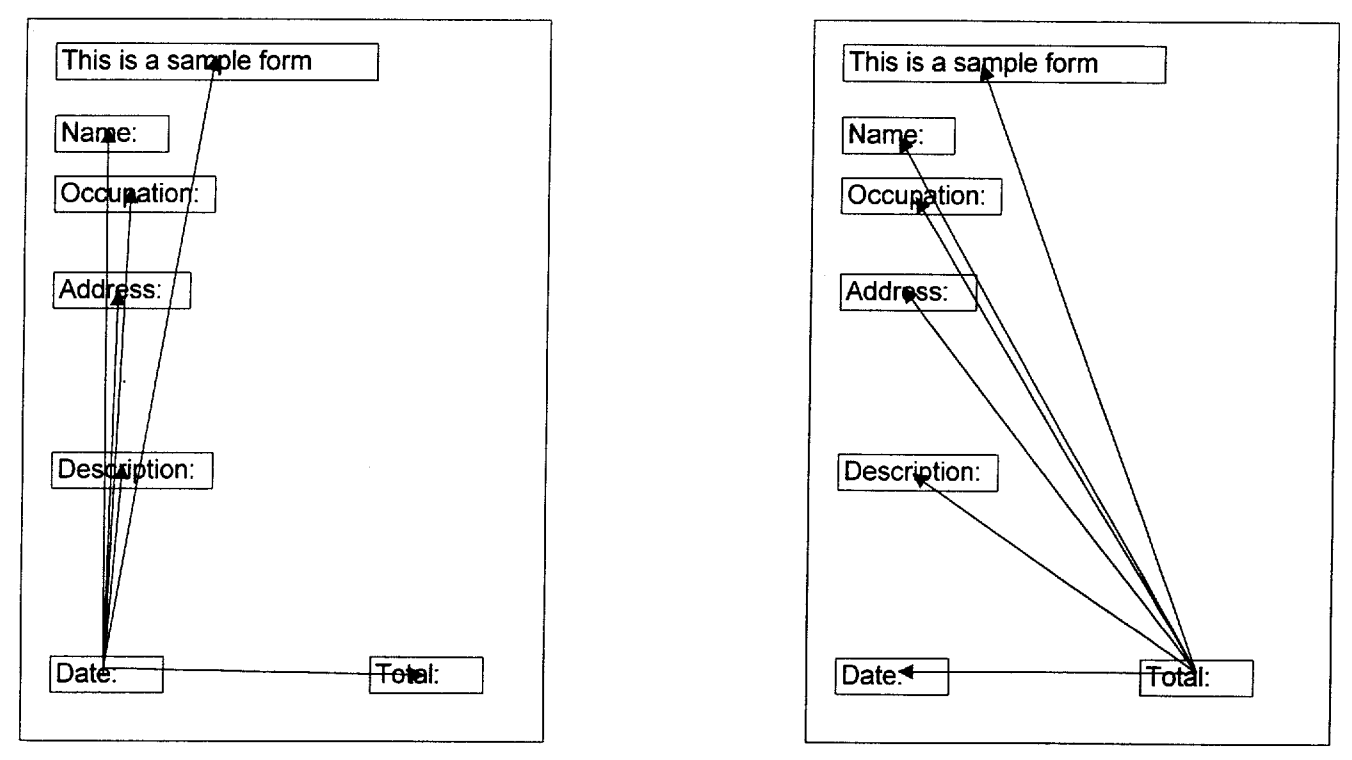

The dynamic data network of an image describes the structure of the image because the vector relationships between the system blocks are fixed on the image, and remain same even when the image is rotated or displaced by a significant amount. FIG. 28a shows a sample form with the text areas used as system blocks, and FIGS. 28b through 28h shown the various vector list $V_i$ between each of the system blocks and the other system blocks.

Additionally, a portion of the dynamic data network D may be defined with respect to the user defined zones. This is done by establishing for each user defined zone $Z_k$ (k=1 to m, the number of user defined zones), a vector list U, containing vectors $u_{(k,i)}$ between zone $Z_k$ and each system block $B_i$:

$$U_i = [u_{(i,j)}, u_{(i,j+1)}, \ldots u_{(i,m)}]$$

In this embodiment, vectors between user defined zones have not been found to add significantly to the robustness of template, and hence are not stored. In alternate embodiments these vectors may be used should they improve the template. In either case, if vectors between the user defined zones were included, dynamic data network D would additionally comprise the set of vector lists U for the user defined zones:

$$D=[V_1, V_2, V_3, \ldots V_n, U_1, U_2, U_3, \ldots U_m]$$

The template module 133 then stores 1213 the created template with a user input name and the defined template data, including the location of each system block in the template, the statistical data on each system block, the dynamic data network information, and the coordinates of the user defined zones. The template module 133 returns control to the definition executive 121.

III. Template Registration

Referring again to FIG. 2, after one or more templates have been defined 201, the user may begin processing documents with the templates. The selection of templates and inputting of documents is described above. Application of the template is the process of automatically registering the document with a template.

Generally, the registration process is very similar to the template definition process, except that instead of creating a new template, the identified system blocks in each input image are compared with the system blocks and dynamic data network of the template. If there is a match, then the system applies the user defined zones of the template to the input image and extracts via optical character recognition any text therein.

Figure 13A:
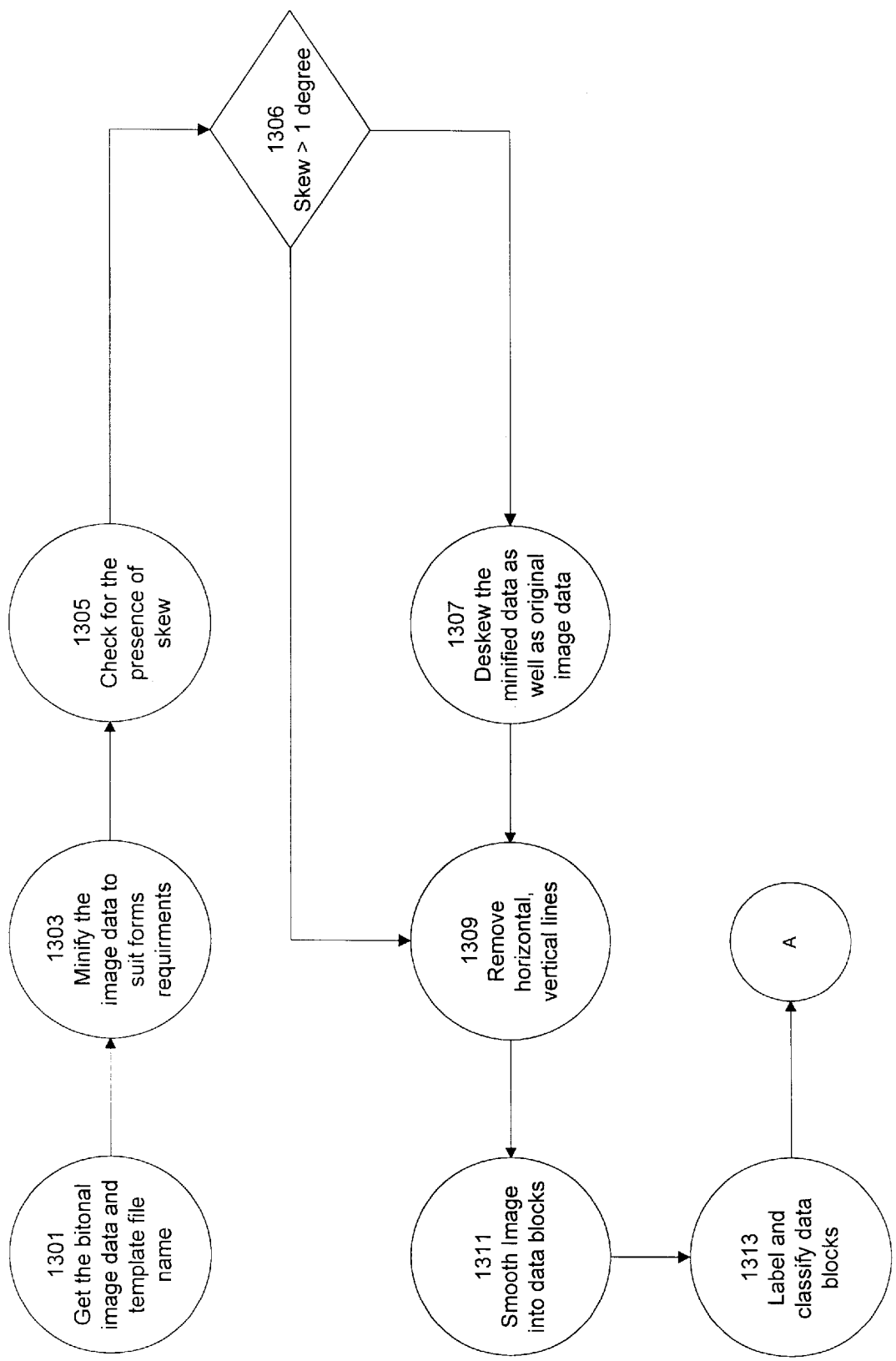
FIGS. 13a and 13b are a flowgraph of the process of registering an input image with a template.
Figure 13B:
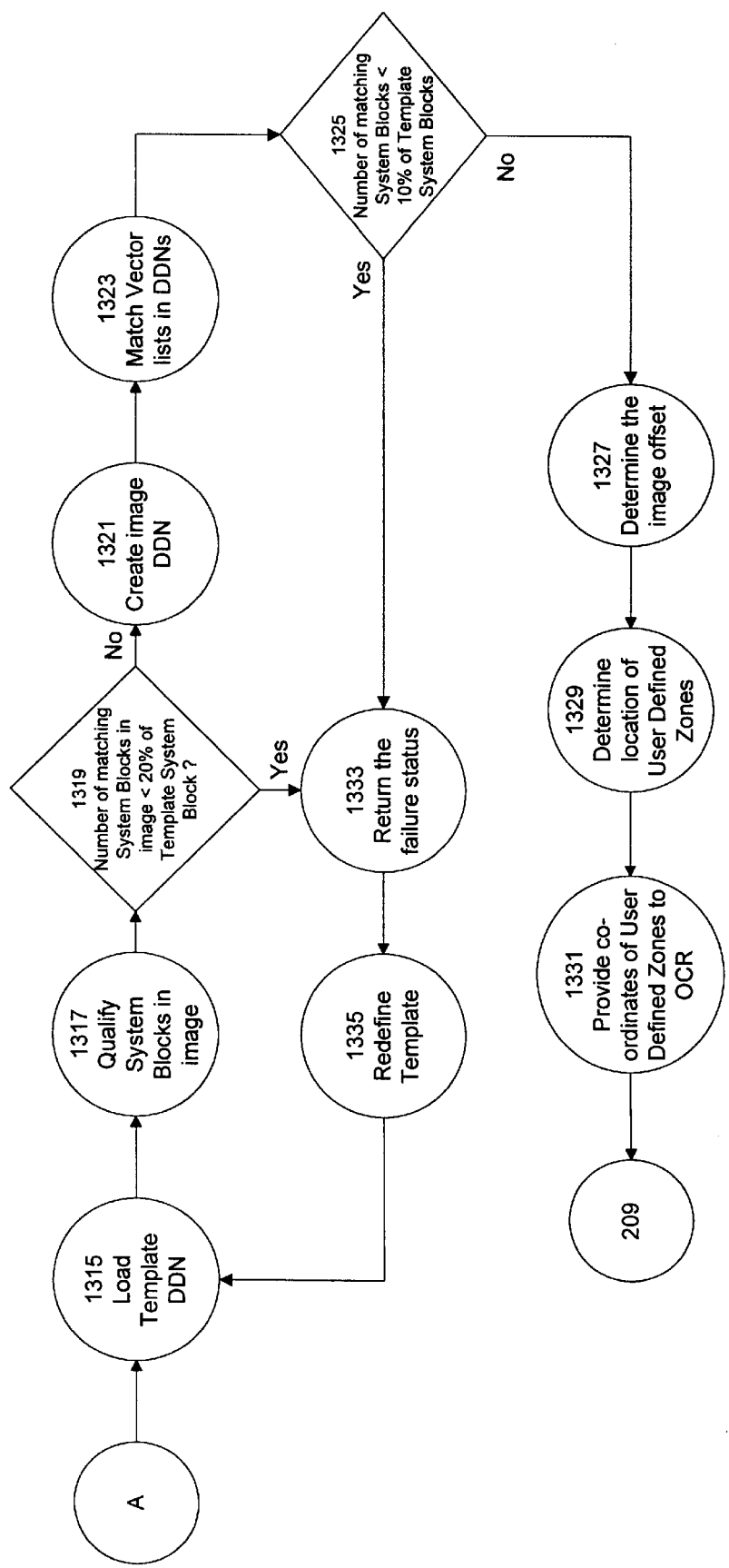

More particularly, referring to FIGS. 13a and 13b there is shown a flowgraph of the registration process. The modules used during registration have been previously described, and their underlying operations are effectively the same. The registration process is managed by the registration executive 135.

The registration executive 135 controls the scanner 115 and scanner control module 139 to scan the input document and obtain 1301 the image data. The image data is thresholded as described to produce a bitonal image. The registration executive 135 invokes the minification module 123 to minimize 1303 the image data to a desired resolution.

The registration executive 135 the invokes the skew detection module 125 to detect 1305 any skew within the image, and report the image skew angle and orientation. The registration executive 135 determines 1306 if the skew exceeds 1°, and if so, calls the deskewing module 127 to deskew 1307 the minimized image and the original image data. The minimized image is stored in the primary image buffer 141.

The registration executive 135 invokes the data preparation module 129 to remove 1309 the horizontal and vertical lines and to smooth 1311 the image into distinct data blocks. The labeling module 131 is then invoked to label and classify 1313 the data blocks with block identification numbers. The labeled blocks are qualified, as above, to produce a list of qualified blocks. The qualified blocks are classified, as described above, as either text, image, or dual blocks.

The registration executive 135 calls the template module 133, which loads 1315 the dynamic data network of the template. The template module 133 then creates a dynamic data network for the input image. This is done by further qualifying 1317 the classified data blocks. This qualification identifies those blocks that are potential system blocks that match the system blocks of template. Each data block in the input image is compared with each system block in the template. The criteria for qualification are:

the classification of the data blocks must be the same (text or image);

the absolute difference between the width of the blocks must be less or equal to 5 pixels;

the absolute difference between the height of the blocks must be less or equal to 5 lines;

the absolute difference between the number of set pixels in the data block and in the system block must be less than 10% of the number of set pixels in the system block.

The template module 133 tests 1319 whether the number of qualified system blocks of the input image is at least 20% of the number of system blocks in the template. If not, the template does not match the input image, and the template module 133 returns 1333 a failure condition to the registration executive 135.

If the number of qualified system blocks meets the threshold value, then the template module 133 creates 1321 a dynamic data network for the input image, as described above. This dynamic data network is not stored as a template, but rather is compared 1323 with the dynamic data network of the user selected template.

The comparison process 1323 iterates over each vector list in the input image dynamic data network, thus effectively iterating over each system block in the input image. The vectors in each image vector list are compared with the vectors in the template vector list. A vector in the input image matches a vector in the template where it is within a predetermined range of dimensional tolerance. In the preferred embodiment, using 50 dpi image, the dimensional tolerance is 3 pixels. That is, if the input image vector's length is within ±3 pixels of the template's vector length, then the vectors match. In other embodiments, a different dimensional tolerance, appropriately scaled, may be used. The vectors may also be compared by the coordinates of the ends points, the dimensional tolerance being approximately squared. The template module 133 maintains a count of the number of matching vectors.

The template module 133 then determines 1325 whether the number of matching vectors, and hence matching system blocks, is at least 10% of the number of system blocks in the template. If so, then the dynamic data networks match, and registration is successful.

If there is match between the dynamic data network of the input image and the template, then the (x,y) offset between the centroids of each pair corresponding system blocks (one in the template, and one in the input image) is determined 1327. This will produce a list of offset values (x,y). The offset value which applies to the largest number of system block pairs is taken as the offset of the image. For example, if five system block pairs have an offset of (2,3), two have an offset of (2,4), and six have an offset of (3,3), then the image offset is (3,3) pixels. The image offset is added to the coordinates of each of the user defined zones, stored in the template, to determine 1329 the coordinates of the user defined zones on the input image.

The coordinates of the user defined zones in the input are provided 1331 to the optical character recognition module 145. The optical character recognition module 145 then extracts 209 (FIG. 2) the text in such zones on the image, providing the data to a file, a database or other storage facility.

If there was not a match with the template, the registration executive 135 returns 1333 a failure condition to the application executive 137, which prompts the user that the template could not be applied. This will occur here the document is not of the same type as the form, or was scanned with significantly different brightness and contrast settings that either significantly more or less pixels were set in the image than in the original image from which the template derived. The user may then check the scanner 115 settings and rescan the document.

In the preferred embodiment, if the match failed, the application executive 137 allows the user to redefine 1335 the template, including redrawing the user defined zones. This allows the user to adapt and evolve the template over time to changes in the form, for example, as new versions of the underlying form are made. The registration executive 135 will then attempt to rematch the modified template. The user may chose to exit if the user does not want to redefine the template.

I claim:

1. A method for automatically extracting information from a plurality of user defined zones in a second image corresponding to a plurality of user defined zones in a first image and compensating for skew and displacement in the second image with respect to the first image, comprising the steps of:

receiving a user input defining at least one user defined zone in relationship to the first image, each user defined zone for extracting information from a portion of a second image corresponding to the user defined zone in the first image;

smoothing the first image to produce blocks of connected pixels;

identifying in the first image a first plurality of blocks from the blocks of connected pixels;

defining at least one first set of vectors among selected ones of the first plurality of blocks, wherein a first vector between any two of the first plurality of blocks describes a skew and displacement invariant relationship between the two blocks;

identifying in the second image a second plurality of blocks of connected pixels;

defining at least one second set of vectors among selected ones of the second plurality of blocks wherein a second vector between any two of the second plurality of blocks describes a skew and displacement invariant relationship between the two blocks;

comparing the at least one first set of vectors to the at least one second set of vectors to determine a percentage of the first set of vectors that are similar to the second set of vectors; and, responsive to the percentage being greater than a predetermined threshold, extracting information only from portions of the second image that correspond to each of the user defined zones of the first image.

2. The method of claim 1 further comprising, before smoothing the image, the steps of:

determining a skew angle and orientation in the first image;

deskewing the first image according to the skew angle and orientation;

removing horizontal lines from the first image; and removing vertical lines from the first image.

3. The method of claim 2, further comprising the steps of:

distinctly identifying each of the first plurality of blocks; and determining for each block a data classification.

4. The method of claim 3, wherein each block is classified as one of a group comprising:

a text block; and an image block;

as a function of block height and block width.

5. The method of claim 2, wherein the step of determining a skew angle and orientation in the first image further comprises the steps of:

smoothing pixel data in the first image into a plurality of blocks;

identifying blocks forming connected sets of pixels, each block having a height and a width;

qualifying as valid blocks those blocks having a height and a width within predetermined ranges;

for each valid block, determining a block skew angle and orientation;

determining an orientation of a majority of the valid blocks; and averaging the block skew angles of the valid blocks.

6. The method of claim 2, wherein the step of removing horizontal lines from the first image further comprises the steps of:

runlength smoothing the first image using a runlength parameter selected to convert broken horizontal line segments into continuous horizontal line segments;

identifying horizontal line segments having less than a maximum height; and removing the identified horizontal line segments by converting set pixels in the horizontal line segments to unset pixels.

7. The method of claim 2, wherein the step of removing vertical lines from the first image further comprises the steps of:

normalizing the first image by adding temporary horizontal lines at the top and bottom of the image;

rotating the first image 90°;

runlength smoothing the first image using a runlength parameter selected to convert broken vertical line segments into continuous vertical line segments;

identifying vertical line segments having less than a maximum height;

removing the identified vertical line segments by converting set pixels in the vertical line segments to unset pixels;

rotating the first image back 90°; and denormalizing the first image by removing the temporary horizontal lines.

8. The method of claim 2, wherein determining a skew angle and orientation in the first image comprises:

a) selecting the orientation held by a majority of the first plurality of blocks; and b) determining the average skew of the first plurality of blocks.

9. The method of claim 1, wherein the step of defining at least one first set of vectors, further comprises the step of:

determining, for each selected block, a vector between a centroid of the selected block and a centroid in each other selected block.

10. The method of claim 9 further comprising the step of:

determining between a centroid of each user defined zone in the first image a vector to a centroid in each selected block in the first image.

11. The method of claim 1, wherein identifying in the first image a first plurality of blocks comprises:

selecting as the first plurality of blocks those blocks of connected pixels having a height within a predetermined height range and a width within a predetermined width range.

12. The method of claim 1, wherein defining at least one first set of vectors among selected ones of the first plurality of blocks comprises:
   segmenting the image into a plurality of segments of substantially equal area;
   determining for each segment, an average area for the blocks in the segment;
   selecting in each segment those blocks having an area approximately equal to the average area for the blocks in the segment; and
   defining at least one first set of vectors among the selected blocks.

13. The method of claim 1, wherein for each of the selected ones of the first plurality of blocks, there is a vector list $V_i$:

$$V_i = [v_{(i,j)}, v_{(i,j+1)}, v_{(i,n)}]$$

where $V_i$ is the vector list for a selected block i;
$v_{(i,j)}$ is a vector from the selected block $B_i$ to another selected block $B_j$; and,
n is the number of selected blocks.

14. The method of claim 1, wherein a first vector in the first set is substantially similar to a second vector in the second set if the first vector is within a predetermined range of dimensional tolerance to the second vector, determined as a function of a resolution of the first image.

15. The method of claim 1, wherein extracting information only from portions of the second image that correspond to each of the user defined zones of the first image comprises:
   locating the user defined zones on the second image according to positions of the selected ones of the second plurality of blocks in the second image and positions of the selected ones of the first plurality of blocks in the first image; and
   extracting text or image data from each located user defined zone on the second image.

16. The method of claim 15, wherein locating the user define zones comprises:
   a) determining an offset between the selected ones of the first plurality of blocks in the first image and the selected ones of the second plurality of blocks in the second image;
   b) adding the offset to the user defined zones in the first image to determine a location for the user defined zones in the second image.

17. A computer readable memory for configuring and controlling a processor to perform the method of claim 1.

18. The method of claim 1, wherein defining at least one second set of vectors among selected ones of the second plurality of blocks comprises:
   segmenting the image into a plurality of segments of substantially equal area;
   determining for each segment, an average area for the blocks in the segment;
   selecting in each segment those blocks having an area approximately equal to the average area for the blocks in the segment; and
   defining at least one second set of vectors among the selected blocks.

19. A method for automatically identifying a plurality of user defined zones in a second image corresponding to a plurality of user defined zones in a first image and compensating for skew and displacement in the second image with respect to the first image, comprising the steps of:
   identifying in the first image a first plurality of blocks of connected pixels;
   defining at least one first set of vectors among selected ones of the first plurality of blocks, wherein a first vector between any two of the first plurality of blocks describes a skew and displacement invariant relationship between the two blocks;
   identifying in the second image a second plurality of blocks of connected pixels, by:
      i) determining a skew angle and orientation in the first image;
      ii) deskewing the first image according to the skew angle and orientation;
      iii) removing horizontal lines from the first image;
      iv) removing vertical lines from the first image by:
         a) normalizing the first image by adding temporary horizontal lines at the top and bottom of the image;
         b) rotating the first image 90°;
         c) runlength smoothing the first image using a runlength parameter selected to convert broken vertical line segments into continuous vertical line segments;
         d) identifying vertical line segments having less than a maximum height;
         e) removing the identified vertical line segments by converting set pixels in the vertical line segments to unset pixels;
         f) rotating the first image back 90°; and
         g) denormalizing the first image by removing the temporary horizontal lines;
      v) smoothing the first image to produce the first plurality of blocks of connected pixels;
   defining at least one second set of vectors among selected ones of the second plurality of blocks wherein a second vector between any two of the second plurality of blocks describes a skew and displacement invariant relationship between the two blocks;
   comparing the at least one first set of vectors to the at least one second set of vectors to establish a degree of similarity therebetween; and,
   responsive to the at least one first set of vectors being similar to the at least one second set of vectors, applying the user defined zones of the first image to the second image.

20. A method for automatically identifying a plurality of user defined zones in a second image corresponding to a plurality of user defined zones in a first image and compensating for skew and displacement in the second image with respect to the first image, comprising the steps of:
   identifying in the first image a first plurality of blocks of connected pixels;
   defining at least one first set of vectors among selected ones of the first plurality of blocks, wherein a first vector between any two of the first plurality of blocks describes a skew and displacement invariant relationship between the two blocks;
   identifying in the second image a second plurality of blocks of connected pixels by:
      segmenting the image into a plurality of segments of substantially equal area;
      determining for each segment, an average area for the blocks in the segment;
      selecting in each segment those blocks having an area approximately equal to the average area for the blocks in the segment; and defining at least one first set of vectors among the selected blocks;

defining at least one second set of vectors among selected ones of the second plurality of blocks wherein a second vector between any two of the second plurality of blocks describes a skew and displacement invariant relationship between the two blocks;

comparing the at least one first set of vectors to the at least one second set of vectors to establish a degree of similarity therebetween; and, responsive to the at least one first set of vectors being similar to the at least one second set of vectors, applying the user defined zones of the first image to the second image.

21. A computer implemented method for automatically identifying a second image as matching first image and compensating for skew and displacement in the second image with respect to the first image, comprising the steps of:

smoothing the first image to produce blocks of connected pixels;

identifying in the first image a first plurality of blocks from the blocks of connected pixels;

defining a first set of vectors among selected ones of the first plurality of blocks, wherein a first vector between any two of the first plurality of blocks describes a skew and displacement invariant relationship between the two blocks;

smoothing the second image to produce smoothed blocks of connected pixels;

identifying in the second image a second plurality of blocks from the smoothed blocks of connected pixels in the second image;

defining a second set of vectors among selected ones of the second plurality of blocks wherein a second vector between any two of the second plurality of blocks describes a skew and displacement invariant relationship between the two blocks;

comparing the first set of vectors to the second set of vectors to determine a percentage of the first set of vectors that are similar to the second set of vectors; and, responsive to the percentage being greater than a predetermined threshold, identifying the second image as matching the first image.

* * * * *

UNITED STATES PATENT AND TRADEMARK OFFICE
CERTIFICATE OF CORRECTION

PATENT NO.     : 5,822,454

DATED          : October 13, 1998

INVENTOR(S)    : Vijayakumar Rangarajan.

It is certified that errors appear in the above-identified patent and that said Letters Patent is hereby corrected as shown below:

Column 21, line 17 replace "$V_i = [v(i,j), v(i,j+1), v(i,n)]$" with

--$V_i = [v(i,j), v(i,j+1), ... v(i,n)]$--

Signed and Sealed this

Tenth Day of August, 1999

Attest:

Q. TODD DICKINSON

*Attesting Officer*     *Acting Commissioner of Patents and Trademarks*